US012369602B2

(12) United States Patent
Münch et al.

(10) Patent No.: US 12,369,602 B2
(45) Date of Patent: Jul. 29, 2025

(54) PROCESS FOR RECOVERING PROTEIN AND FIBRE COMPOSITIONS FROM BREWERS' SPENT GRAIN

(71) Applicant: ANHEUSER-BUSCH INBEV S.A., Brussels (BE)

(72) Inventors: Steffen Münch, Leuven (BE); Daniel Valdeperez, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 648 days.

(21) Appl. No.: 17/633,864

(22) PCT Filed: Aug. 10, 2020

(86) PCT No.: PCT/EP2020/072432
§ 371 (c)(1),
(2) Date: Feb. 8, 2022

(87) PCT Pub. No.: WO2021/028405
PCT Pub. Date: Feb. 18, 2021

(65) Prior Publication Data
US 2022/0322698 A1 Oct. 13, 2022

(30) Foreign Application Priority Data

| Aug. 9, 2019 | (BE) | 2019/5518 |
| Aug. 9, 2019 | (BE) | 2019/5519 |
| Sep. 6, 2019 | (BE) | 2019/5589 |

(51) Int. Cl.
*A23J 3/14* (2006.01)
*A23J 1/00* (2006.01)
(Continued)

(52) U.S. Cl.
CPC .......... *A23J 1/005* (2013.01); *A23J 1/12* (2013.01); *A23K 10/38* (2016.05); *A23L 7/115* (2016.08);
(Continued)

(58) Field of Classification Search
CPC ..... A23J 1/005; A23J 1/12; A23J 3/14; A23K 10/37–38; A23L 7/115; A23L 7/20;
(Continued)

(56) References Cited

U.S. PATENT DOCUMENTS 312,593 A * 2/1885 Wiesebrock
2,070,285 A * 2/1937 Lissauer ............ A23K 10/38
235/60 G
(Continued)

FOREIGN PATENT DOCUMENTS

| EP | 0050330 A2 | 4/1982 |
| EP | 0369818 A2 | 5/1990 |

(Continued)

OTHER PUBLICATIONS

Gomez-Caravaca et al., "Use of air classification technology as green process to produce functional barley flours naturally enriched of alkylresorcinols, β-glucans and phenolic compounds," Food Research International 73: 88-96 (2015).
(Continued)

*Primary Examiner* — Drew E Becker
(74) *Attorney, Agent, or Firm* — ArentFox Schiff LLP

(57) ABSTRACT

The present disclosure provides processes for the production of protein and fibre compositions from brewer's spent grain. The process comprises micronising dried brewer's spent grain using a pin mill and fractionating the micronised brewer's spent grain using an air classifier. The present disclosure also provides protein and fibre compositions, processes for producing food products incorporating the
(Continued)

protein or fibre compositions, and food products comprising the protein or fibre compositions.

17 Claims, 2 Drawing Sheets

(51) Int. Cl.

| | | |
|---|---|---|
| A23J 1/12 | (2006.01) | |
| A23K 10/38 | (2016.01) | |
| A23L 7/10 | (2016.01) | |
| A23L 7/20 | (2016.01) | |
| A23L 33/185 | (2016.01) | |
| A23L 33/22 | (2016.01) | |
| B02C 9/04 | (2006.01) | |
| B02C 11/02 | (2006.01) | |
| B02C 11/08 | (2006.01) | |
| C12F 3/10 | (2006.01) | |

(52) U.S. Cl.
CPC .............. *A23L 7/20* (2016.08); *A23L 33/185* (2016.08); *A23L 33/22* (2016.08); *B02C 9/04* (2013.01); *B02C 11/02* (2013.01); *B02C 11/08* (2013.01); *C12F 3/10* (2013.01)

(58) Field of Classification Search
CPC ......... A23L 33/185; A23L 33/22; B02C 9/04; B02C 11/02; B02C 11/08; C12F 3/10; Y02P 60/87
See application file for complete search history.

(56) References Cited

U.S. PATENT DOCUMENTS

| | | | | |
|---|---|---|---|---|
| 2,165,950 | A * | 7/1939 | Willkie | C05F 5/008 426/472 |
| 2,754,211 | A * | 7/1956 | Siefker | A23J 1/12 426/1 |
| 4,341,805 | A * | 7/1982 | Chaudhary | A23L 33/21 426/481 |
| 4,377,601 | A * | 3/1983 | Dreese | A23L 7/115 426/31 |
| 4,632,833 | A * | 12/1986 | Gannon | A23L 5/34 426/465 |
| 5,063,078 | A * | 11/1991 | Foehse | A23L 7/165 426/482 |
| 5,135,765 | A * | 8/1992 | Kishi | A23L 33/21 426/624 |
| 5,260,092 | A * | 11/1993 | Gannon | A23L 5/34 426/60 |
| 6,083,547 | A | 7/2000 | Katta et al. | |
| 8,518,467 | B2 | 8/2013 | Srinivasan et al. | |
| 2006/0040024 | A1* | 2/2006 | Srinivasan | B02B 1/02 426/482 |
| 2009/0175993 | A1 | 7/2009 | Erasmus | |
| 2010/0092651 | A1 | 4/2010 | Kaukovirta-Norja et al. | |
| 2012/0005916 | A1* | 1/2012 | Lopez | A23K 50/10 34/398 |
| 2018/0295864 | A1* | 10/2018 | Jimenez | A23L 11/45 |
| 2019/0063835 | A1* | 2/2019 | Dinger | F26B 11/16 |
| 2019/0200641 | A1* | 7/2019 | Woonton | A23L 7/197 |
| 2020/0138065 | A1* | 5/2020 | Petry | A23L 2/66 |
| 2020/0260757 | A1* | 8/2020 | McEwan | A23J 1/12 |
| 2021/0001345 | A1* | 1/2021 | Medhin | B02B 1/08 |
| 2022/0226835 | A1* | 7/2022 | Barber | B03C 7/006 |
| 2022/0279812 | A1* | 9/2022 | Lundgren | B03B 9/061 |
| 2022/0280949 | A1* | 9/2022 | Lundgren | B02C 23/14 |
| 2023/0372948 | A1* | 11/2023 | Motte | B02B 1/08 |

FOREIGN PATENT DOCUMENTS

| | | |
|---|---|---|
| EP | 0581741 A2 | 7/1993 |
| EP | 0606080 A1 | 7/1994 |
| EP | 1127495 A1 | 8/2001 |
| JP | 2803853 B2 | 9/1998 |
| WO | 00/27222 A1 | 5/2000 |
| WO | 2018/050863 A1 | 3/2018 |
| WO | 2019/023647 A1 | 1/2019 |
| WO | 2020/028446 A1 | 2/2020 |
| WO | 2020/214502 A1 | 10/2020 |
| WO | 2020/227631 A1 | 11/2020 |

OTHER PUBLICATIONS

Kissell et al., "Protein and Fiber Enrichment of Cookie Flour with Brewer's Spent Grain," Cereal Chem. 56: 261-266 (1979).

Ozvural et al., "Utilization of brewer's spent grain in the production of Frankfurters," International Journal of Food Science and Technology 44(6); 1093-1099 (2009).

Office Action received for Japanese Patent Application No. 2022-508554, mailed on Jun. 18, 2024, 9 pages (5 pages of English Translation and 4 pages of Original Document).

* cited by examiner

PROCESS FOR RECOVERING PROTEIN AND FIBRE COMPOSITIONS FROM BREWERS' SPENT GRAIN

CROSS-REFERENCE TO RELATED APPLICATIONS

This application is a 371 national-stage application of International PCT Application No. PCT/EP2020/072432, filed Aug. 10, 2020, which claims priority to Belgian Patent Application No. BE2019/5518, filed Aug. 9, 2019; Belgian Patent Application No. BE2019/5519, filed Aug. 9, 2019; and Belgian Patent Application No. BE2019/5589, filed Sep. 6, 2019, all of which are incorporated herein by reference in their entirety.

FIELD OF THE INVENTION

The present invention relates to processes for the production of protein and fibre food compositions from brewer's spent grain. The present invention also relates to protein and fibre compositions, processes for producing food products incorporating the protein or fibre compositions, and food products comprising the protein or fibre compositions.

BACKGROUND

Distillery or brewery by-products are abundantly produced during distillery and brewery processes. Brewer's spent grain (BSG) is the most abundant by-product generated in the beer-brewing process. This material comprises malt and grain husks obtained as a solid fraction after the mash filtration or lautering. To date, this distillery or brewery by-product has mainly been put to low value uses, in particular as an animal feed.

Every year, human eating patterns are becoming more unbalanced, resulting in deficiency in certain nutrients while other nutrients are being overconsumed. For example, an average western adult consumes 12 to 15 g of fibres per day, while the recommended daily value lies between 28 and 30 g. Current human eating patterns are associated with weight gain and other health problems (e.g. diabetes, heart problems, etc.). This is leading to a change in consumer habits, with interest in more nutritional products growing. One of the current challenges for food manufacturers is to be able to provide products that meet these consumer expectations. Several measures to promote reformulation of foods and beverages have been suggested by the World Health Organization for western countries, such as the promotion of healthy nutrition, improvements to the nutritional quality of the food supply, and consumer-friendly labelling, among others.

In addition to the above, according to the report *The State of Food Security and Nutrition in the World* (2019) from the Food and Agriculture Organization (FAO) of the United Nations (UN), an estimated 820 million people lack sufficient food—up from 811 million in the prior year. In parallel, levels of obesity continue to increase in all regions, particularly among school-age children and adults. The world needs to adapt to feed nearly 10 billion people by 2050, and some of the options suggested by the World Resources Institute's (WRI's) new report Creating a Sustainable Food Future to close the food gap is to increase the food production without expanding agricultural land and a shift to healthier and more sustainable diets.

Distillery or brewery by-products, particularly BSG, are rich in nutrients, particularly protein and fibre. There is therefore an opportunity to use these by-products to produce nutritious food products for human consumption, which can be used as a food ingredient and can thereby help to address the issues discussed above.

Various attempts have been made to produce food compositions for human consumption from distillery or brewery by-products such as BSG.

WO 2018/050863 relates to food compositions, particularly pet food compositions, having a high content of plant protein. The plant protein is prepared by processing Brewer's Spent Grain (BSG) having a moisture content of about 15% to about 35% by weight, so as to reduce the particle size of the BSG and separating the processed BSG by sieving so as to provide a low particle size, high protein fraction.

WO 2019/023647 relates to methods and systems for the extraction of protein rich flour and fibre rich flour from brewer's spent grains (BSG). The invention is particularly aimed at illustrating the possibility of obtaining different protein contents in the protein and fibre rich flours through drying, milling and fractionating BSG. A cell mill is used in which the milling device comprises rotating blades arranged on a shaft and the fractionating takes place using a classifier comprising one or more screens, rotating bars and/or sieves.

U.S. Pat. No. 4,341,805 relates to methods for classifying BSG into fractions having either a high protein content or a high dietary fibre content. Dried spent grain is pulverized and then separated into fractions by sieving.

There remains a need for a process to more effectively separate distillery or brewery by-products, particularly BSG, into high protein and high fibre fractions, with the protein content of the high protein fraction being maximised and the fibre content of the high fibre fraction being maximised. Such a process would allow the use of distillery or brewery by-products to be expanded in terms of food products for human consumption, thereby improving the nutritional value and health benefits of such food products. Such food products may be particularly suitable for people suffering from diabetes, high cholesterol, obesity, constipation, etc.

It is an object of the present invention to provide an improved process for the production of high protein and high fibre compositions from distillery or brewery by-products and to thereby improve human eating habits through the incorporation of distillery or brewery by-products in the human diet.

SUMMARY OF THE INVENTION

The present invention and embodiments thereof serve to provide a solution to one or more of above-mentioned disadvantages.

The present invention provides an improved process for the production of high protein and high fibre compositions from brewer's spent grain. The process comprises:
  a) providing dried brewer's spent grain having a moisture content of 10% by weight or less;
  b) micronising the dried brewer's spent grain using a pin mill to provide micronised brewer's spent grain;
  c) fractionating the micronised brewer's spent grain using an air classifier to provide a coarse fraction and a fine fraction; and
  d) collecting the coarse fraction to provide the fibre composition and collecting the fine fraction to provide the protein composition.

The brewer's spent grain preferably comprises spent barley and, optionally, one or more other spent grains or other starchy material selected from rice, corn, sorghum and cassava, preferably selected from rice and corn. It is preferably the spent grain obtained from a brewing process in which the grains used for brewing comprise barley in an amount of at least 40% by weight, preferably at least 60% by weight, preferably at least 70% by weight, based on the total dry matter weight of the grains. The brewer's spent grain used as a starting material for the process preferably has a total dietary fibre content (% dry matter by weight) of from 48% to less than 62%, as determined by AOAC 991.43, and a total protein content (% dry matter by weight) of greater than 20% to less than 35%, as determined by the Kjeldahl method using a conversion factor of 6.25. The step of providing dried brewers' spent grain preferably comprises collecting brewers' spent grain from a brewery, e.g. from the mash filter or lauter tun, and then drying to a moisture content of 10% by weight or less, preferably 8% or less, preferably 5% by weight or less. The drying preferably takes place within 4 hours, preferably within 3 hours, preferably within less than 3 hours, of the collecting. Preferably, the brewer's spent grain is dewatered, preferably using a decanter or screw press, before drying. The drying is preferably carried out in an oven, a flash dryer, a ring dryer or a fluidised bed dryer.

If necessary, the dried brewer's spent grain may be subjected to declumping before micronising, preferably using a hammer mill.

The pin mill used in the micronisation step is preferably a counter-rotating pin mill. The micronised brewer's spent grain preferably has a bimodal particle size distribution. The particle size (d50) of the micronised brewer's spent grain is preferably from 30 to 130 µm, preferably from 30 to 70 µm, preferably from 40 to 100 µm, preferably from 40 to 60 µm, and the particle size (d90) is preferably from 150 to 350 µm, preferably from 150 to 300 µm, preferably from 190 to 280 µm, preferably from 190 to 260 µm, as determined by laser diffraction.

The fractionation preferably comprises selecting the rotational speed and air flow rate of the air classifier to optimise the fractionation into the coarse fraction and the fine fraction.

In a variation to the process, the coarse fraction may be re-micronised. According to this process variation, the process comprises:
a) providing dried brewer's spent grain having a moisture content of 10% by weight or less;
b) micronising the dried brewer's spent grain using a pin mill to provide micronised brewer's spent grain;
c) fractionating the micronised brewer's spent grain using an air classifier to provide a first coarse fraction and a first fine fraction;
d) micronising the first coarse fraction, preferably using a pin mill, to provide a micronised first coarse fraction;
e) fractionating the micronised first coarse fraction, preferably using an air classifier, to provide a second coarse fraction and a second fine fraction;
f) collecting the second coarse fraction to provide the fibre composition; and
g) combining the first and second fine fractions to provide the protein composition.

The preferred features of the process as described generally herein apply mutatis mutandis to this process variation.

In a further possible variation to the process, the coarse fraction may be subjected to a second fractionation. According to this process variation, the process comprises:
a) providing dried brewer's spent grain having a moisture content of 10% by weight or less;
b) micronising the dried brewer's spent grain using a pin mill to provide micronised brewer's spent grain;
c) fractionating the micronised brewer's spent grain using an air classifier to provide a first coarse fraction and a first fine fraction;
d) fractionating the first coarse fraction, preferably using an air classifier, to provide a second coarse fraction and a second fine fraction;
e) collecting the second coarse fraction to provide the fibre composition; and
f) combining the first and second fine fractions to provide the protein composition.

The preferred features of the process as described generally herein apply mutatis mutandis to this process variation.

The fibre composition obtained according to the processes of the present invention preferably has a particle size (d90) of between 200 and 500 µm, preferably between 200 and 450 µm, preferably between 250 and 350 µm, as determined by laser diffraction. Its total dietary fibre content (% dry matter by weight) is preferably greater than 55%, preferably greater than 60%, as determined by AOAC 991.43. Its total insoluble fibre content (% dry matter by weight) is preferably between 55 and 75%, preferably between 60 and 70%, and its total soluble dietary fibre content (% dry matter by weight) is preferably between 0 and 10%, preferably between 0 and 5%, as determined by AOAC 2011.25. Its total protein content (% dry matter by weight) is preferably between 15 and 30%, preferably between 18 and 25%, as determined by the Kjeldahl method using a conversion factor of 6.25. The total combined content of protein and dietary fibre (% dry matter by weight) in the fibre composition is preferably between 70 and 100%, preferably between 85 and 100%, and the ratio of protein to dietary fibre (dry matter by weight) is preferably between 0.30 and 0.55, preferably between 0.30 and 0.45, preferably between 0.30 and 0.40, wherein the total dietary fibre content is determined by AOAC 991.43 and the total protein content is determined by the Kjeldahl method using a conversion factor of 6.25. The fibre composition preferably has a bulk density of from 0.34 to 0.45 g/mL, a tapped density of from 0.42 to 0.60 g/mL and a Hausner index of from 1.15 to 1.34, preferably from 1.20 to 1.24.

The total dietary fibre content (dry matter by weight) of the fibre composition obtained according to the processes of the present invention is preferably at least 10%, preferably at least 12%, preferably at least 14% higher than the total dietary fibre content (dry matter by weight) of the brewer's spent grain, as determined by AOAC 991.43. The total protein content (dry matter by weight) of the fibre composition is preferably at least 16%, preferably at least 18%, preferably at least 20% lower than the total protein content (dry matter by weight) of the brewer's spent grain, as determined by the Kjeldahl method using a conversion factor of 6.25.

The fibre composition obtained according to the processes of the present invention preferably has an iron content of from 9 to 15 mg, preferably from 10 to 14 mg, per 100 g (dry matter) of the fibre composition. The iron content of the fibre composition is preferably at least 18%, preferably at least 24%, preferably at least 26%, preferably at least 28% lower than the iron content of the brewer's spent grain.

The protein composition obtained according to the processes of the present invention preferably has a particle size (d90) of between 20 and 200 µm, preferably between 40 and 130 µm, preferably between 50 and 130 µm, preferably between 50 and 100 µm, as determined by laser diffraction. Its total dietary fibre content (% dry matter by weight) is preferably greater than 35% and below 55%, as determined by AOAC 991.43. Its total insoluble fibre content (% dry matter by weight) is preferably between 30 and 60%, preferably between 35 and 50%, and its total soluble dietary fibre content (% dry matter by weight) is preferably between 0 and 10%, preferably between 1 and 5%, as determined by AOAC 2011.25. Its total protein content (% dry matter by weight) is preferably at least 33%, preferably between 33 and 50%, preferably between 35 and 40%, as determined by the Kjeldahl method using a conversion factor of 6.25. The total combined content of protein and dietary fibre (% dry matter by weight) in the protein composition is preferably between 80 and 100% and the ratio of protein to dietary fibre (dry matter by weight) is preferably between 0.75 and 1.5, wherein the total dietary fibre content is determined by AOAC 991.43 and the total protein content is determined by the Kjeldahl method using a conversion factor of 6.25. The protein composition preferably has a bulk density of from 0.25 to 0.35 g/mL, a tapped density of from 0.30 to 0.42 g/mL and a Hausner index of from 1.18 to 1.30, preferably from 1.18 to 1.22.

The total protein content (dry matter by weight) of the protein composition obtained according to the processes of the present invention is preferably at least 19%, preferably at least 21%, preferably at least 23% higher than the total protein content (dry matter by weight) of the brewer's spent grain, as determined by the Kjeldahl method using a conversion factor of 6.25. The total dietary fibre content (dry matter by weight) of the protein composition is preferably at least 13%, preferably at least 14%, preferably at least 16% lower than the total dietary fibre content (dry matter by weight) of the brewer's spent grain, as determined by AOAC 991.43.

The protein composition obtained according to the processes of the present invention preferably has an iron content of from 14 to 26 mg, preferably from 17 to 26 mg, preferably from 19 to 25 mg, per 100 g (dry matter) of the protein composition. The iron content of the protein composition is preferably at least 20%, preferably at least 24%, preferably at least 26%, preferably at least 28% higher than the iron content of the brewer's spent grain.

The present invention also provides a fibre composition produced from brewer's spent grain, wherein the fibre composition:
  is in the form of a powder having a particle size (d90) of between 200 and 500 μm, preferably between 200 and 450 μm, preferably between 250 and 350 μm, as determined by laser diffraction;
  has a total dietary fibre content (% dry matter by weight) of greater than 55%, preferably greater than 60%, as determined by AOAC 991.43;
  has a total insoluble fibre content (% dry matter by weight) of between 55 and 75%, preferably between 60 and 70%, and a total soluble dietary fibre content (% dry matter by weight) of between 0 and 10%, preferably between 0 and 5%, as determined by AOAC 2011.25; and has a total protein content (% dry matter by weight) of between 15 and 30%, preferably between 18 and 25%, as determined by the Kjeldahl method using a conversion factor of 6.25.

The fibre composition preferably has a total combined content of protein and dietary fibre (% dry matter by weight) of between 70 and 100%, preferably between 85 and 100%, and a ratio of protein to dietary fibre (dry matter by weight) of between 0.30 and 0.55, preferably between 0.30 and 0.45, preferably between 0.30 and 0.40, wherein the total dietary fibre content is determined by AOAC 991.43 and the total protein content is determined by the Kjeldahl method using a conversion factor of 6.25. Its bulk density is preferably from 0.34 to 0.45 g/mL, its tapped density is preferably from 0.42 to 0.60 g/mL and its Hausner index is preferably from 1.15 to 1.34, preferably from 1.20 to 1.24. The fibre composition preferably has an iron content of from 9 to 15 mg, preferably from 10 to 14 mg, per 100 g (dry matter) of the fibre composition. The fibre composition is preferably produced according to the process of the present invention.

The present invention also provides a protein composition produced from brewer's spent grain, wherein the protein composition:
  is in the form of a powder having a particle size (d90) of between 20 and 200 μm, preferably between 40 and 130 μm, preferably between 50 and 130 μm, preferably between 50 and 100 μm, as determined by laser diffraction;
  has a total dietary fibre content (% dry matter by weight) of greater than 35% and below 55%, as determined by AOAC 991.43;
  has a total insoluble fibre content (% dry matter by weight) of between 30 and 60%, preferably between 35 and 50%, and a total soluble dietary fibre content (% dry matter by weight) of between 0 and 10%, preferably between 1 and 5%, as determined by AOAC 2011.25; and
  has a total protein content (% dry matter by weight) of at least 33%, preferably between 33 and 50%, preferably between 35 and 40%, as determined by the Kjeldahl method using a conversion factor of 6.25.

The protein composition preferably has a total combined content of protein and dietary fibre (% dry matter by weight) of between 80 and 100% and a ratio of protein to dietary fibre (dry matter by weight) of between 0.75 and 1.5, wherein the total dietary fibre content is determined by AOAC 991.43 and the total protein content is determined by the Kjeldahl method using a conversion factor of 6.25. Its bulk density is preferably from 0.25 to 0.35 g/mL, its tapped density is preferably from 0.30 to 0.42 g/mL and its Hausner index is preferably from 1.18 to 1.30, preferably from 1.18 to 1.22. The protein composition preferably has an iron content of from 14 to 26 mg, preferably from 17 to 26 mg, preferably from 19 to 25 mg, per 100 g (dry matter) of the protein composition. The protein composition is preferably produced according to the process of the present invention.

The present invention also provides a process for producing a food product, wherein the process comprises incorporating the fibre composition of the present invention or the protein composition of the present invention into the food product. The present invention also provides a food product comprising the fibre composition of the present invention or the protein composition according to the present invention.

DETAILED DESCRIPTION OF THE INVENTION

Figure 1:
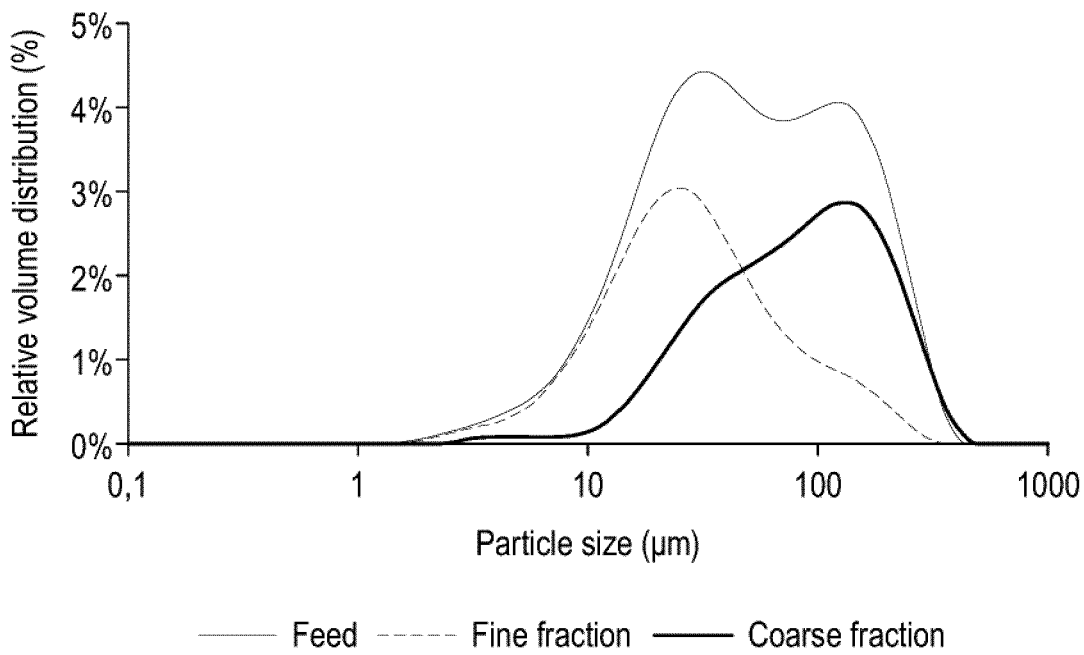
FIG. 1 shows the particle size distributions of the powder obtained in Example 2 after attrition milling and subsequent air classification of the attrition milled powder.

The present invention provides an improved process for the production of protein and fibre compositions from brewer's spent grain; high protein and high fibre compositions (also referred to herein as "powdery food compositions" or "powdery compositions"); processes for producing food products incorporating the protein or fibre compositions; and food products comprising the protein or fibre compositions.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein when referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, insofar as such variations are appropriate to perform the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members.

"Fibre", "Total dietary fibre" or "roughage" as used herein refers to the portion of plant-derived food that cannot be completely broken down by human digestive enzymes. Preferably, fibre comprises soluble and insoluble fibre. Fibre may or may not comprise non-starch polysaccharides, cellulose, hemicellulose, resistant starch, dextrin, polydextrose, inulin, lignin, chitin, chitosan, pectin, beta-glucans, gums, oligosaccharides or a combination thereof. "Soluble fibre" as used herein refers to a fibre which may dissolve in a liquid. "Insoluble fibre" as used herein refers to a fibre which does not dissolve in water.

"Protein" as used herein refers to a biomolecule comprising of one or more amino acid residues. "Amino acid" as used herein refers to an organic compound comprising an amine (—$NH_2$) and a carboxyl (—COOH) functional groups, along with a side chain specific to each amino acid.

"Essential amino acid" as used herein refers to an amino acid which cannot be produced from other compounds by the human body, and thus must be taken in as food. Preferably, an essential amino acid is an amino acid chosen from the group comprising phenylalanine, valine, threonine, tryptophan, methionine, leucine, isoleucine, lysine or histidine.

"Conditionally essential amino acid" as used herein refers to an amino acid which become essential under specific circumstances such as illness or stress. Preferably, a conditionally essential amino acid is an amino acid chosen from the group comprising arginine, cysteine, glutamine, glycine, proline or tyrosine.

"Non-essential amino acid" as used herein refers to an amino acid which can be produced from other compounds by the human body. Preferably, a non-essential amino acid is an amino acid chosen from the group comprising alanine, aspartic acid, asparagine, glutamic acid, serine, selenocysteine or pyrrolysine.

"Sugar" us used herein refers to monosaccharides, disaccharides, oligosaccharides, polysaccharides or a combination thereof. Preferably, sugar as used herein refers to fructose, galactose, glucose, maltose, lactose, sucrose or a combination thereof.

"Carbohydrate" as used herein refers to a biomolecule consisting of carbon (C), hydrogen (H) and oxygen (O) atoms.

"Particle size" as used herein refers to particle size as measured using laser diffraction using a laser diffraction particle size analyser (such as Mastersizer® 3000, Malvern Panalytical Ltd.). The parameter "d90" as used herein gives an idea of the size distribution and refers to the size at which 90% of a composition's volume comprises particles with a size less than the specified value (e.g. d90 of 150 μm refers that 90% of a composition's volume comprises particles with a size less than 150 μm). Similarly, the parameter "d50" refers to the size at which 50% of a composition's volume comprises particles with a size less than the specified value.

"Barley malt" as used herein refers to a germinated cereal grain, the cereal grain comprising barley, that has been obtained through a process known as "malting". The cereal grain may or may not comprise other starch sources, such as rice, oats, wheat, corn, sorghum, millet or combination thereof.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to a person skilled in the art from this disclosure, in one or more embodiments. Furthermore, while some embodiments described herein include some, but not other, features included in other embodiments, combinations of features of different embodiments are meant to be within the scope of the invention, and form different embodiments, as would be understood by those in the art. For example, in the following claims, any of the claimed embodiments can be used in any combination.

Brewer's Spent Grain

The starting material for the process of the present invention is brewer's spent grain. Brewer's spent grain is a by-product of the brewing industry following the mashing step. At this point of the brewing process, the soluble fraction (known as 'wort') is taken forward for further brewing steps while the insoluble fraction is removed. This insoluble fraction is brewer's spent grain.

The brewer's spent grain used in the process of the present invention is preferably obtained after brewing with grains comprising barley and, optionally, one or more other grains or starchy materials such as rice, corn, sorghum and cassava, particularly rice and/or corn. The grains used for brewing (i.e. the grain mix used at the start of the brewing process) preferably comprise barley in an amount of at least 40% by weight (for example at least 40, 45, 50, 55, 60, 65 or 70% by weight, or any intermediate value), preferably at least 60% by weight, preferably at least 70% by weight, based on the total dry matter weight of the grains.

The brewer's spent grain used in the process of the present invention preferably has a total dietary fibre content (% dry matter by weight) of from 48% to less than 62%, preferably from 50% to less than 60% (for example 51, 52, 53, 54, 55, 56, 57, 58 or 59%, or any intermediate value), as determined by AOAC 991.43, and a total protein content (% dry matter by weight) of greater than 20% to less than 35%, preferably of greater than 25% to less than 35% (for example 26, 27, 28, 29, 30, 31, 32, 33 or 34%, or any intermediate value), as determined by the Kjeldahl method using a conversion factor of 6.25.

Process

The present invention provides an improved process for the production of high protein and high fibre compositions from brewer's spent grain. The process comprises:
a) providing dried brewer's spent grain having a moisture content of 10% by weight or less;
b) micronising the dried brewer's spent grain using a pin mill to provide micronised brewer's spent grain;
c) fractionating the micronised brewer's spent grain using an air classifier to provide a coarse fraction and a fine fraction; and
d) collecting the coarse fraction to provide the fibre composition and collecting the fine fraction to provide the protein composition.

The step of providing dried brewers' spent grain preferably comprises collecting brewers' spent grain from a brewery, e.g. from the mash filter or lauter tun, and then drying to a moisture content of 10% by weight or less (for example 9% by weight or less, 8% by weight or less, 7% by weight or less, 6% by weight or less, 5% by weight or less, or 4% by weight or less), preferably 8% or less, preferably 5% by weight or less. The drying preferably takes place within 4 hours, preferably within 3 hours, preferably within less than 3 hours, of the collecting. Preferably, the brewer's spent grain is dewatered, preferably using a decanter or screw press, before drying. The drying is preferably carried out in an oven, a flash dryer, a ring dryer or a fluidised bed dryer.

If necessary, the dried brewer's spent grain may be subjected to declumping before micronising, preferably using a hammer mill. This step may be helpful if significant agglomeration has taken place during the drying step and will partly depend on the choice of drying equipment. Those skilled in the art will be readily able to recognise whether or not a declumping step is desirable in any given case.

The micronisation step of the present invention uses a pin mill. A pin mill mills materials by the action of pins moving repeatedly past each other, typically by rotation. The present inventors have found that the use of a pin mill in the micronisation step of the present invention is effective to micronise the brewer's spent grain to the desired extent and results in a particularly effective fractionation in the fractionation step of the present invention.

The pin mill used in the micronisation step is preferably a counter-rotating pin mill. A counter-rotating pin mill has two counter-rotating pin disks enabling very high relative disc speeds to be achieved.

The micronised brewer's spent grain preferably has a bimodal particle size distribution. A bimodal size distribution is a size distribution comprising two populations of particle sizes. The presence of a second population may be evident by the presence of a second peak in the particle size distribution (see FIG. 1) or it may be evident by the presence of a shoulder in the particle size distribution (see FIG. 2), dependent on the extent to which the two populations overlap.

The particle size (d50) of the micronised brewer's spent grain is preferably from 30 to 130 µm, preferably from 30 to 70 µm, preferably from 40 to 100 µm, preferably from 40 to 60 µm, as determined by laser diffraction. For example, the d50 may be 30, 35, 40, 45, 50, 55, 60, 65, 70, 75, 80, 85, 90, 95, 100, 105, 110, 115, 120, 125, 130 µm or any intermediate value.

The particle size (d90) of the micronised brewer's spent grain is preferably from 150 to 350 µm, preferably from 150 to 300 µm, preferably from 190 to 280 µm, preferably from 190 to 260 µm, as determined by laser diffraction. For example, the d90 may be 150, 160, 170, 180, 190, 200, 210, 220, 230, 240, 250, 260, 270, 280, 290, 300, 310, 320, 330, 340, 350 µm or any intermediate value.

Pin mills are known. The calibration of any given pin mill to achieve the preferred particle size distribution of the micronised brewer's spent grain is a matter of routine for those skilled in the art.

The fractionation step of the present invention uses an air classifier. Air classifiers separate materials based on their behaviour in an air flow and thus separate on the basis of particle size, shape and density. This is a different separation principle compared to sieving, which does not distinguish between particles based on their density.

Air classifiers are known and the skilled person will be able to select a suitable air classifier based on the requirements at hand. For any given air classifier, the skilled person will be able to calibrate the classifier in order to achieve the desired fractionation, e.g. by selecting the rotational speed and air flow rate of the air classifier.

The present inventors have found that the particular combination of a pin mill and an air classifier is able to achieve a surprisingly effective fractionation of brewer's spent grain into a protein composition having high protein content and a fibre composition having high fibre content. Other types of mill, such as an attrition mill, were shown to be effective as milling technologies but, surprisingly, when subsequently fractionated using an air classifier, the fractionation into high protein and high fibre fractions was less effective. It could not have been predicted that the selection of a particular combination of milling and fractionation technologies could have such a significant influence on the effectiveness of the fractionation.

In a variation to the process, the coarse fraction may be re-micronised. According to this process variation, the process comprises:

h) providing dried brewer's spent grain having a moisture content of 10% by weight or less;
i) micronising the dried brewer's spent grain using a pin mill to provide micronised brewer's spent grain;
j) fractionating the micronised brewer's spent grain using an air classifier to provide a first coarse fraction and a first fine fraction;
k) micronising the first coarse fraction, preferably using a pin mill, to provide a micronised first coarse fraction;
l) fractionating the micronised first coarse fraction, preferably using an air classifier, to provide a second coarse fraction and a second fine fraction;
m) collecting the second coarse fraction to provide the fibre composition; and n) combining the first and second fine fractions to provide the protein composition.

The preferred features of the process as described generally herein apply mutatis mutandis to this process variation.

In a further possible variation to the process, the coarse fraction may be subjected to a second fractionation. According to this process variation, the process comprises:

g) providing dried brewer's spent grain having a moisture content of 10% by weight or less;
h) micronising the dried brewer's spent grain using a pin mill to provide micronised brewer's spent grain;
i) fractionating the micronised brewer's spent grain using an air classifier to provide a first coarse fraction and a first fine fraction;
j) fractionating the first coarse fraction, preferably using an air classifier, to provide a second coarse fraction and a second fine fraction;
k) collecting the second coarse fraction to provide the fibre composition; and
l) combining the first and second fine fractions to provide the protein composition.

The preferred features of the process as described generally herein apply mutatis mutandis to this process variation.

According to the above process variations, it has been found that the overall yield of the protein composition can be improved.

The fibre composition obtained according to the processes of the present invention preferably has a particle size (d90) of between 200 and 500 μm, preferably between 200 and 450 μm, preferably between 250 and 350 μm, as determined by laser diffraction. For example, the d90 of the fibre composition may be 250, 260, 270, 280, 290, 300, 310, 320, 330, 340 or 350 μm, or any intermediate value. Its total dietary fibre content (% dry matter by weight) is preferably greater than 55%, preferably greater than 60%, as determined by AOAC 991.43. Its total insoluble fibre content (% dry matter by weight) is preferably between 55 and 75%, preferably between 60 and 70%, and its total soluble dietary fibre content (% dry matter by weight) is preferably between 0 and 10%, preferably between 0 and 5%, as determined by AOAC 2011.25. Its total protein content (% dry matter by weight) is preferably between 15 and 30%, preferably between 18 and 25%, as determined by the Kjeldahl method using a conversion factor of 6.25. The total combined content of protein and dietary fibre (% dry matter by weight) in the fibre composition is preferably between 70 and 100%, preferably between 85 and 100%, and the ratio of protein to dietary fibre (dry matter by weight) is preferably between 0.30 and 0.55, preferably between 0.30 and 0.45, preferably between 0.30 and 0.40, wherein the total dietary fibre content is determined by AOAC 991.43 and the total protein content is determined by the Kjeldahl method using a conversion factor of 6.25. The fibre composition preferably has a bulk density of from 0.34 to 0.45 g/mL, a tapped density of from 0.42 to 0.60 g/mL and a Hausner index of from 1.15 to 1.34, preferably from 1.20 to 1.24. The total dietary fibre content (dry matter by weight) of the fibre composition is preferably at least 10%, preferably at least 12%, preferably at least 14% higher than the total dietary fibre content (dry matter by weight) of the brewer's spent grain, as determined by AOAC 991.43. The total protein content (dry matter by weight) of the fibre composition is preferably at least 16%, preferably at least 18%, preferably at least 20% lower than the total protein content (dry matter by weight) of the brewer's spent grain, as determined by the Kjeldahl method using a conversion factor of 6.25.

The fibre composition preferably has an iron content of from 9 to 15 mg (for example 9, 10, 11, 12, 13, 14 or 15 mg, or any intermediate value), preferably from 10 to 14 mg, per 100 g (dry matter) of the fibre composition. The iron content of the fibre composition is preferably at least 18% (for example at least 18, 19, 20, 21, 22, 23, 24, 25, 26, 27 or 28%, or any intermediate value), preferably at least 24%, preferably at least 26%, preferably at least 28% lower than the iron content of the brewer's spent grain. The extent to which the iron content of the fibre composition is reduced by the process of the present invention is surprising.

The fibre composition obtained according to the processes of the present invention is described in more detail below in the description of the fibre composition of the present invention.

The protein composition obtained according to the processes of the present invention preferably has a particle size (d90) of between 20 and 200 μm, preferably between 40 and 130 μm, preferably between 50 and 130 μm, preferably between 50 and 100 μm, as determined by laser diffraction. Its total dietary fibre content (% dry matter by weight) is preferably greater than 35% and below 55%, as determined by AOAC 991.43. Its total insoluble fibre content (% dry matter by weight) is preferably between 30 and 60%, preferably between 35 and 50%, and its total soluble dietary fibre content (% dry matter by weight) is preferably between 0 and 10%, preferably between 1 and 5%, as determined by AOAC 2011.25. Its total protein content (% dry matter by weight) is preferably at least 33%, preferably between 33 and 50%, preferably between 35 and 40%, as determined by the Kjeldahl method using a conversion factor of 6.25. The total combined content of protein and dietary fibre (% dry matter by weight) in the protein composition is preferably between 80 and 100% and the ratio of protein to dietary fibre (dry matter by weight) is preferably between 0.75 and 1.5, wherein the total dietary fibre content is determined by AOAC 991.43 and the total protein content is determined by the Kjeldahl method using a conversion factor of 6.25. The protein composition preferably has a bulk density of from 0.25 to 0.35 g/mL, a tapped density of from 0.30 to 0.42 g/mL and a Hausner index of from 1.18 to 1.30, preferably from 1.18 to 1.22. The total protein content (dry matter by weight) of the protein composition is preferably at least 19%, preferably at least 21%, preferably at least 23% higher than the total protein content (dry matter by weight) of the brewer's spent grain, as determined by the Kjeldahl method using a conversion factor of 6.25. The total dietary fibre content (dry matter by weight) of the protein composition is preferably at least 13%, preferably at least 14%, preferably at least 16% lower than the total dietary fibre content (dry matter by weight) of the brewer's spent grain, as determined by AOAC 991.43.

The protein composition obtained according to the processes of the present invention preferably has an iron content of from 14 to 26 mg (for example 14, 15, 16, 17, 18, 19, 20, 21, 22, 23, 24, 25 or 26 mg, or any intermediate value), preferably from 17 to 26 mg, preferably from 19 to 25 mg, per 100 g (dry matter) of the protein composition. The iron content of the protein composition is preferably at least 20% (for example at least 20, 21, 22, 23, 24, 25, 26, 27 or 28%, or any intermediate value), preferably at least 24%, preferably at least 26%, preferably at least 28% higher than the iron content of the brewer's spent grain. The extent to which the iron content of the protein composition is increased by the process of the present invention is surprising.

The protein composition obtained according to the processes of the present invention is described in more detail below in the description of the protein composition of the present invention.

Protein Composition

The protein composition of the present invention is produced from brewer's spent grain. The protein composition:
- is in the form of a powder having a particle size (d90) of between 20 and 200 µm, preferably between 40 and 130 µm, preferably between 50 and 130 µm, preferably between 50 and 100 µm, as determined by laser diffraction;
- has a total dietary fibre content (% dry matter by weight) of greater than 35% and below 55%, as determined by AOAC 991.43;
- has a total insoluble fibre content (% dry matter by weight) of between 30 and 60%, preferably between 35 and 50%, and a total soluble dietary fibre content (% dry matter by weight) of between 0 and 10%, preferably between 1 and 5%, as determined by AOAC 2011.25; and
- has a total protein content (% dry matter by weight) of at least 33%, preferably between 33 and 50%, preferably between 35 and 40%, as determined by the Kjeldahl method using a conversion factor of 6.25.

The protein composition of the present invention is also referred to as a powdery food composition comprising a protein fraction and a fibre fraction.

The inventors have observed that such protein composition is suitable as an ingredient to increase the protein and fibre level in different final food products and the average daily intake of proteins and fibres of the consumers of the food products containing them. In addition to health benefits associated with an increased fibre intake, the specified mixture of fibres and proteins is even more beneficial for obtaining final food products which are deemed to be advantageous for lowering the fat uptake in the gut, increasing growth for building or repairing tissues (e.g. muscle, bone, cartilage skin or blood), increasing anti-inflammatory properties, increasing gut health (increase in digestion, stimulation of the gut microbiota and normalizing bowel movements), stimulating weight loss and for the maintenance of a healthy physique. The protein composition is especially advantageous for obtaining final food products which are deemed to be beneficial for people wanting to maintain or obtain a lean body mass, and for diabetic patients or patients suffering from high cholesterol or constipation. Moreover, due to the high fibre and the high protein content, the addition of a moderate amount of the protein composition would suffice to increase the protein and the fibre content of the final food product, without increasing the sugar or the fat content. By the addition of a moderate amount of the protein composition, the chance that the protein composition could influence the taste of the final food product is minimized.

Additionally, the protein composition is obtained from a product that has been traditionally wasted or used as repurposing it as animal feed, pet food or compost after the corresponding brewing process, which is readily available in large quantities throughout the year, making the protein composition sustainable from an economic and environmental standpoint.

The protein content of said protein composition can be measured with conventional means in the art, e.g. by Foss equipment based on the Kjeldahl method or with any other suitable method known in the art, such as but not limiting to the Dumas method. The Nitrogen:protein conversion factor used in the Kjeldahl method is 6.25. A suitable method can be found according to BS 4401 Pt 2: 1980.

Preferably, the ratio of protein and fibre fraction (i.e. protein to dietary fibre) in said protein composition is between 0.70 and 3.50, more preferably between 0.70 and 3.00, even more preferably between 0.70 and 2.50, even more preferably between 0.70 and 2.00, even more preferably between 0.70 and 1.9, even more preferably between 0.70 and 1.8, even more preferably between 0.90 and 1.21, even more preferably between 0.70 and 1.20, even more preferably between 0.70 and 1.19, even more preferably between 0.70 and 1.18, even more preferably between 0.70 and 1.17, even more preferably between 0.70 and 1.16, even more preferably between 0.70 and 1.15, even more preferably between 0.70 and 1.14, even more preferably between 0.70 and 1.13, even more preferably between 0.70 and 1.12, even more preferably between 0.70 and 1.11, even more preferably between 0.70 and 1.10, even more preferably between 0.70 and 1.09, even more preferably between 0.70 and 1.08, even more preferably between 0.70 and 1.07, even more preferably between 0.70 and 1.06, even more preferably between 0.70 and 1.05, even more preferably between 0.70 and 1.04, even more preferably between 0.70 and 1.03, even more preferably between 0.70 and 1.02, even more preferably between 0.70 and 1.01, even more preferably between 0.70 and 1.00, even more preferably between 0.70 and 0.99, even more preferably between 0.70 and 0.98, even more preferably between 0.70 and 0.97, even more preferably between 0.70 and 0.96, even more preferably between 0.70 and 0.95, even more preferably between 0.70 and 0.94, even more preferably between 0.70 and 0.93, even more preferably between 0.70 and 0.92, even more preferably between 0.70 and 0.91, even more preferably between 0.70 and 0.90, even more preferably between 0.71 and 0.89, even more preferably between 0.72 and 0.88, even more preferably between 0.73 and 0.87, even more preferably between 0.74 and 0.86, even more preferably between 0.75 and 0.85.

In a further or other embodiment the ratio of protein and fibre fraction in said protein composition is between 0.70 and 3.50, more preferably between 0.75 and 3.50, even more preferably between 0.80 and 3.50, even more preferably between 0.85 and 3.50, even more preferably between 0.90 and 3.50, even more preferably between 0.95 and 3.50, even more preferably between 1.00 and 3.50, even more preferably between 1.05 and 3.50, even more preferably between 1.10 and 3.50, even more preferably between 1.15 and 3.50, even more preferably between 1.20 and 3.50, even more preferably between 1.25 and 3.50, even more preferably between 1.30 and 3.50, even more preferably between 1.35 and 3.50, even more preferably between 1.40 and 3.50, even more preferably between 1.45 and 3.50, even more preferably between 1.50 and 3.50, even more preferably between 1.55 and 3.50, even more preferably between 1.60 and 3.50, even more preferably between 1.65 and 3.50, even more preferably between 1.70 and 3.50, even more preferably between 1.75 and 3.50, even more preferably between 1.80 and 3.50, even more preferably between 1.85 and 3.50, even more preferably between 1.90 and 3.50, even more preferably between 1.95 and 3.50, even more preferably between 2.00 and 3.50, even more preferably between 2.05 and 3.50, even more preferably between 2.10 and 3.50, even more preferably between 2.15 and 3.50, even more preferably between 2.20 and 3.50, even more preferably between 2.25 and 3.50, even more preferably between 2.30 and 3.50, even more preferably between 2.35 and 3.50, even more preferably between 2.40 and 3.50, even more preferably between 2.45 and 3.50, even more preferably between 2.50 and 3.50.

Preferably, the ratio of protein and fibre fraction in said protein composition is at least 0.70, more preferably at least 0.71, even more preferably at least 0.72, even more preferably at least 0.73, even more preferably at least 0.74, even more preferably at least 0.75. In a further embodiment the ratio of the protein and fibre fraction is at least 0.76, preferably at least 0.77, more preferably at least 0.78, even more preferably at least 0.79, even more preferably at least 0.80, even more preferably at least 0.81, even more preferably at least 0.82, even more preferably at least 0.83, even more preferably at least 0.84, even more preferably at least 0.85, even more preferably at least 0.86, even more preferably at least 0.87, even more preferably at least 0.88, even more preferably at least 0.89, even more preferably at least 0.90, even more preferably at least 0.91, even more preferably at least 0.92, even more preferably at least 0.93, even more preferably at least 0.94, even more preferably at least 0.95, even more preferably 0.96, even more preferably at least 0.97, even more preferably at least 0.98, even more preferably at least 0.99, even more preferably at least 1.00. The ratio of the protein and the fibre fraction may or may not be at least 1.1 or higher e.g. 1.2, 1.3, 1.4, 1.5, 1.6, 1.7, 1.8, 1.9, 2.0, 2.1, 2.2, 2.3, 2.4 or 2.5.

In an embodiment, the ratio of protein and fibre fraction in said protein composition is at most 3.50, more preferably at most 3.40, even more preferably at most 3.30, even more preferably at most 3.20, even more preferably at most 3.10, even more preferably at most 3.00, even more preferably at most 2.90, even more preferably at most 2.80, even more preferably at most 2.70, even more preferably at most 2.60, even more preferably at most 2.50, even more preferably at most 2.40, even more preferably at most 2.30, even more preferably at most 2.20, even more preferably at most 2.10, even more preferably at most 2.00, even more preferably at most 1.90, even more preferably at most 1.80, even more preferably at most 1.70, even more preferably at most 1.60, even more preferably at most 1.50, even more preferably at most 1.40, even more preferably at most 1.30, even more preferably at most 1.20, even more preferably at most 1.10, even more preferably at most 1.00.

Preferably, the total amount of said protein and said fibre fraction (i.e. the total combined content of protein and dietary fibre) in said protein composition is at most 100% dry mass by weight, more preferably at most 99% dry mass by weight, even more preferably at most 98% dry mass by weight, even more preferably at most 97% dry mass by weight, even more preferably at most 96% dry mass by weight, even more preferably at most 95% dry mass by weight, even more preferably at most 94% dry mass by weight, even more preferably at most 93% dry mass by weight, even more preferably at most 92% dry mass by weight, even more preferably at most 91% dry mass by weight, even more preferably at most 90% dry mass by weight, of said composition.

Preferably, the total amount of said protein and said fibre fraction in said protein composition is at least 70% dry mass by weight, more preferably at least 71% dry mass by weight, even more preferably at least 72% dry mass by weight, even more preferably at least 73% dry mass by weight, even more preferably at least 74% dry mass by weight, even more preferably at least 75% dry mass by weight, even more preferably at least 76% dry mass by weight, even more preferably at least 77% dry mass by weight, even more preferably at least 78% dry mass by weight, even more preferably at least 79% dry mass by weight, even more preferably at least 80% dry mass by weight, even more preferably at least 81% dry mass by weight.

In a particularly preferred embodiment, the total amount of said protein and said fibre fraction in said protein composition is between 80 and 100% dry mass by weight of said composition. The ratio of protein and fibre fraction in said protein composition is between 0.75 and 1.50.

The protein composition preferably has a total combined content of protein and dietary fibre (% dry matter by weight) of between 80 and 100% (e.g. 80, 85, 90 or 95%, or any intermediate value) and a ratio of protein to dietary fibre (dry matter by weight) of between 0.75 and 1.5 (e.g. 0.75, 0.80, 0.90, 0.95, 1.00, 1.05, 1.10, 1.15, 1.20, 1.25, 1.30, 1.35, 1.40, 1.45, 1.50 or any intermediate value), wherein the total dietary fibre content is determined by AOAC 991.43 and the total protein content is determined by the Kjeldahl method using a conversion factor of 6.25.

The bulk density of the protein composition is preferably from 0.25 to 0.35 g/mL, its tapped density is preferably from 0.30 to 0.42 g/mL and its Hausner index is preferably from 1.18 to 1.30, preferably from 1.18 to 1.22. The protein composition is preferably produced according to the process of the present invention.

A protein composition comprising a higher amount of proteins is deemed especially beneficial for obtaining a final food product for athletes. The protein composition is deemed to improve the nutritional composition of the final food product, whereby the final food products comprising the specified fibre and protein fractions are especially beneficial for improving the body composition and the metabolic risk factors, improving insulin sensitivity glucose and lipid levels, facilitating weight loss alongside and improving lean mass retention. Moreover, the final food product comprises a beneficial effect on plasma lipids.

In a particularly preferred embodiment, said fibre fraction (i.e. the total dietary fibre content of the protein composition) has an insoluble fibre content of between 80 and 100% dry mass by weight, preferably between 85 and 100% dry mass by weight, more preferably between 90 and 100% dry mass by weight, even more preferably between 91 and 99% dry mass by weight, even more preferably between 91 and 98% dry mass by weight, even more preferably between 91 and 97% dry mass by weight, even more preferably between 91 and 96% dry mass by weight, even more preferably between 91 and 95% dry mass by weight, based on the total weight of the fibre fraction. The protein composition wherein the fibre fraction comprises mostly insoluble fibre is deemed to lead to final food products which are especially advantageous for improving the bowel movement and for helping with weight loss or with the maintenance of a healthy weight.

In a particularly preferred embodiment, said fibre fraction comprises between 5 and 90% dry mass by weight, preferably between 10 and 90% dry mass by weight, more preferably between 15 and 90% dry mass by weight, even more preferably between 20 and 90% dry mass by weight, even more preferably between 25 and 90% dry mass by weight, even more preferably between 30 and 90% dry mass by weight, even more preferably between 30 and 95% dry mass by weight, more preferably between 35 and 95% dry mass by weight, even more preferably between 35 and 90% dry mass by weight, even more preferably between 40 and 90% dry mass by weight, even more preferably between 40 and 85% dry mass by weight, even more preferably between 40 and 80% dry mass by weight, even more preferably between 40 and 75% dry mass by weight, even more preferably between 45 and 75% dry mass by weight, even more preferably between 45 and 70% dry mass by weight, even more preferably between 50 and 70% dry mass by weight, even more preferably between 50 and 65% dry mass by weight, even more preferably between 50 and 60% dry mass by weight, arabinoxylan, based on the total weight of the fibre fraction. Foods comprising said preferred protein composition are deemed to be especially beneficial for improving the immunomodular activity, the cholesterol lowering activity, the absorption of minerals, the attenuation of type II diabetes and the prebiotics effect.

Preferably, said fibre fraction comprises at most 90% dry mass by weight, more preferably at most 85% dry mass by weight, even more preferably at most 80% dry mass by weight, even more preferably at most 75% dry mass by weight, even more preferably at most 70% dry mass by weight, even more preferably at most 65% dry mass by weight, even more preferably at most 60% dry mass by weight, arabinoxylan, based on the total weight of the fibre fraction. Preferably, said fibre fraction comprises at least 5% dry mass by weight, more preferably at least 10% dry mass by weight, even more preferably at least 15% dry mass by weight, even more preferably at least 20% dry mass by weight, even more preferably at least 25% dry mass by weight, even more preferably at least 30% dry mass by weight, even more preferably at least 35% dry mass by weight, even more preferably at least 40% dry mass by weight, even more preferably at least 45% dry mass by weight, even more preferably at least 50% dry mass by weight, arabinoxylan, based on the total weight of the fibre fraction.

In a particularly preferred embodiment, said fibre fraction comprises between 0 and 60% dry mass by weight, preferably between 0 and 55% dry mass by weight, more preferably between 5 and 55% dry mass by weight, even more preferably between 5 and 50% dry mass by weight, even more preferably between 10 and 50% dry mass by weight, even more preferably between 10 and 45% dry mass by weight, even more preferably between 15 and 45% dry mass by weight, even more preferably between 15 and 40% dry mass by weight, even more preferably between 20 and 40% dry mass by weight, even more preferably between 20 and 35% dry mass by weight, even more preferably between 25 and 35% dry mass by weight, cellulose, based on the total weight of the fibre fraction.

Preferably, said fibre fraction comprises at most 70% dry mass by weight, more preferably at most 65% dry mass by weight, even more preferably at most 60% dry mass by weight, even more preferably at most 55% dry mass by weight, even more preferably at most 50% dry mass by weight, even more preferably at most 45% dry mass by weight, even more preferably at most 40% dry mass by weight, even more preferably at most 35% dry mass by weight, cellulose, based on the total weight of the fibre fraction. Preferably, said fibre fraction comprises at least 5% dry mass by weight, more preferably at least 8% dry mass by weight, even more preferably at least 10% dry mass by weight, even more preferably at least 12% dry mass by weight, even more preferably at least 14% dry mass by weight, even more preferably at least 16% dry mass by weight, even more preferably at least 18% dry mass by weight, even more preferably at least 20% dry mass by weight, even more preferably at least 22% dry mass by weight, even more preferably at least 24% dry mass by weight, cellulose, based on the total weight of the fibre fraction.

In a particularly preferred embodiment, said fibre fraction comprises between 0 and 50% dry mass by weight, preferably between 0 and 45% dry mass by weight, more preferably between 0 and 40% dry mass by weight, even more preferably between 0 and 35% dry mass by weight, even more preferably between 0 and 30% dry mass by weight, even more preferably between 0 and 20% dry mass by weight, even more preferably between 5 and 20% dry mass by weight, even more preferably between 10 and 20% dry mass by weight, lignin, based on the total weight of the fibre fraction.

Preferably, said fibre fraction comprises at most 70% dry mass by weight, more preferably at most 65% dry mass by weight, even more preferably at most 60% dry mass by weight, even more preferably at most 55% dry mass by weight, even more preferably at most 50% dry mass by weight, even more preferably at most 45% dry mass by weight, even more preferably at most 40% dry mass by weight, even more preferably at most 35% dry mass by weight, even more preferably at most 30% dry mass by weight, even more preferably at most 25% dry mass by weight, even more preferably at most 20% dry mass by weight, lignin, based on the total weight of the fibre fraction. Preferably, said fibre fraction comprises at least 2% dry mass by weight, more preferably at least 4% dry mass by weight, even more preferably at least 6% dry mass by weight, even more preferably at least 8% dry mass by weight, even more preferably at least 10% dry mass by weight, even more preferably at least 12% dry mass by weight, even more preferably at least 14% dry mass by weight, lignin, based on the total weight of the fibre fraction.

In a particularly preferred embodiment, said fibre fraction has an soluble fibre content of between 0 and 20% dry mass by weight, preferably between 1 and 19% dry mass by weight, even more preferably between 2 and 18% dry mass by weight, even more preferably between 3 and 17% dry mass by weight, even more preferably between 4 and 16% dry mass by weight, even more preferably between 5 and 15% dry mass by weight, even more preferably between 5 and 14% dry mass by weight, even more preferably between 5 and 13% dry mass by weight, even more preferably between 5 and 12% dry mass by weight, even more preferably between 5 and 11% dry mass by weight, even more preferably between 5 and 10% dry mass by weight, even more preferably between 5 and 9% dry mass by weight, based on the total weight of the fibre fraction.

In a preferred embodiment, the protein composition has an amino acid content of between 5 and 90% dry mass by weight, preferably between 10 and 85% dry mass by weight, more preferably between 10 and 80% dry mass by weight, even more preferably between 10 and 75% dry mass by weight, even more preferably between 10 and 70% by weight, even more preferably between 10 and 65% dry mass by weight, even more preferably between 20 and 65% dry mass by weight, even more preferably between 25 and 65% dry mass by weight, even more preferably between 10 and 50% dry mass by weight, even more preferably between 11 and 49% dry mass by weight, even more preferably between 12 and 48% dry mass by weight, even more preferably between 13 and 47% dry mass by weight, even more preferably between 14 and 46% dry mass by weight, even more preferably between 15 and 45% dry mass by weight, even more preferably between 16 and 44% dry mass by weight, even more preferably between 17 and 43% dry mass by weight, even more preferably between 18 and 42% dry mass by weight, even more preferably between 19 and 41% dry mass by weight, even more preferably between 20 and 41% dry mass by weight, of said composition. In a more preferred embodiment, the protein composition has an amino acid content of between 34 and 46% dry mass by weight, more preferably between 35 and 45% dry mass by weight, even more preferably between 36 and 44% dry mass by weight, even more preferably between 37 and 43% dry mass by weight, even more preferably between 38 and 42% dry mass by weight, even more preferably between 39 and 41% dry mass by weight, of said composition.

Preferably, the protein composition has an amino acid content of at most 90% dry mass by weight, preferably at most 85% dry mass by weight, more preferably at most 80% dry mass by weight, even more preferably at most 75% dry mass by weight, even more preferably at most 70% dry mass by weight, even more preferably at most 65% dry mass by weight, even more preferably at most 60% dry mass by weight, of said composition. Preferably, the protein composition has an amino acid content of at least 5% dry mass by weight, preferably of at least 10% dry mass by weight, more preferably of at least 15% dry mass by weight, even more preferably of at least 20% dry mass by weight, even more preferably of at least 25% dry mass by weight, even more preferably of at least 30% dry mass by weight, of said composition.

In a particularly preferred embodiment, the protein composition has an essential amino acid content of between 5 and 25% by weight, more preferably between 7 and 23% dry mass by weight, even more preferably between 9 and 21% dry mass by weight, even more preferably between 11 and 19% dry mass by weight, of said protein composition; a conditionally essential amino acid content of between 1 and 20% dry mass by weight, more preferably between 3 and 18% dry mass by weight, even more preferably between 5 and 16% dry mass by weight, even more preferably between 6 and 15% dry mass by weight, even more preferably between 7 and 14% dry mass by weight, of said protein composition; and a non-essential amino acid content of between 5 and 25% dry mass by weight, more preferably between 7 and 23% dry mass by weight, even more preferably between 9 and 21% dry mass by weight, even more preferably between 11 and 19% dry mass by weight, of said composition.

In a preferred embodiment, the protein composition has a starch content of between 0 and 12% dry mass by weight, preferably between 0 and 10% dry mass by weight, more preferably between 0 and 9% dry mass by weight, even more preferably between 0 and 8% dry mass by weight, even more preferably between 0 and 7% dry mass by weight, even more preferably between 1 and 7% dry mass by weight, even more preferably between 2 and 7% dry mass by weight, even more preferably between 3 and 7% dry mass by weight, of said composition. By ensuring that the protein composition does not comprise a starch content of more than 10% dry mass by weight, the protein composition is especially suitable for obtaining final food products comprising a low starch level, which are deemed to be beneficial for reducing the insulin levels, improving weight management and reducing risk of heart disease.

In a preferred embodiment, the protein composition comprises a moisture content of at most 10% by weight of said composition. A moisture content of at most 10% by weight is beneficial for improving the shelf-life of the protein composition, more particularly for improving the time before the protein composition becomes lumpy and therefore hard to dissolve, and/or before the protein composition becomes contaminated. Lower moisture levels improved the shelf-life even more. An improved shelf-life is beneficial for the storage of the protein composition (powdery composition).

Preferably, the protein composition comprises a moisture content of at most 10% by weight, preferably of at most 9% by weight, more preferably of at most 8% by weight, even more preferably of at most 7% by weight, even more preferably of at most 6% by weight, even more preferably of at most 5% by weight, even more preferably of at most 4% by weight, even more preferably of at most 3% by weight, even more preferably of at most 2% by weight, even more preferably of at most 1% by weight, of said composition. Preferably, the protein composition comprises a moisture content of between 0 and 10% by weight, more preferably between 0 and 9% by weight, even more preferably between 0 and 8% by weight, even more preferably between 0 and 7% by weight, even more preferably between 0 and 6% by weight, even more preferably between 0 and 5% by weight, even more preferably between 0 and 4% by weight, even more preferably between 0 and 3% by weight, even more preferably between 0 and 2% by weight, even more preferably between 0 and 1% by weight, of said composition.

In a preferred embodiment, the protein composition has a fat content of between 0 and 15% dry mass by weight, more preferably between 0 and 14% dry mass by weight, even more preferably between 0 and 13% dry mass by weight, even more preferably between 0 and 12% dry mass by weight, even more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 1 and 8% dry mass by weight, even more preferably between 2 and 8% dry mass by weight, even more preferably between 3 and 8% dry mass by weight, even more preferably between 4 and 8% dry mass by weight, of said protein composition. The protein composition is beneficial for obtaining final food products comprising a lower fat content. Food products having a low fat content are deemed to be beneficial for weight loss and lowering the risk of obtaining heart disease, high cholesterol and diabetes.

In a preferred embodiment, the protein composition has an insoluble fibre content of between 15 and 60% dry mass by weight, more preferably between 16 and 60% dry mass by weight, even more preferably between 17 and 60% dry mass by weight, even more preferably between 18 and 60% dry mass by weight, even more preferably between 19 and 60% dry mass by weight, even more preferably between 20 and 60% dry mass by weight, even more preferably between 21 and 59% dry mass by weight, even more preferably between 22 and 58% dry mass by weight, even more preferably between 23 and 57% dry mass by weight, even more preferably between 24 and 56% dry mass by weight, even more preferably between 25 and 55% dry mass by weight, even more preferably between 26 and 54% dry mass by weight, even more preferably between 27 and 53% dry mass by weight, even more preferably between 28 and 52% dry mass by weight, even more preferably between 29 and 51% dry mass by weight, even more preferably between 30 and 50% dry mass by weight, even more preferably between 20 and 50% dry mass by weight, even more preferably between 31 and 49% dry mass by weight, even more preferably between 32 and 48% dry mass by weight, even more preferably between 33 and 47% dry mass by weight, even more preferably between 34 and 46% dry mass by weight, of said composition.

In a preferred embodiment, the protein composition has a soluble fibre content of between 0 and 15% dry mass by weight, more preferably between 0 and 14% dry mass by weight, even more preferably between 0 and 13% dry mass by weight, even more preferably between 0 and 12% dry mass by weight, even more preferably between 0 and 11% dry mass by weight, even more preferably between 0 and 12% dry mass by weight, even more preferably between 0 and 10% dry mass by weight, even more preferably between 0 and 8%, even more preferably between 1 and 8%, even more preferably between 1 and 7%, even more preferably between 1 and 6%, even more preferably between 1 and 5%, of said composition.

In a preferred embodiment, the protein composition has an iron content of from 14 to 26 mg (for example 14, 15, 16, 17, 18, 19, 20, 21, 22, 23, 24, 25 or 26 mg, or any intermediate value), preferably from 17 to 26 mg, preferably from 19 to 25 mg, per 100 g (dry matter) of the protein composition. It is a particular advantage of the present invention that such high levels of iron can be achieved in the protein composition.

In a preferred embodiment, the protein composition has a particle size d90 (as measured by laser diffraction) of at most 200 μm, more preferably at most 150 μm, even more preferably at most 145 μm, even more preferably at most 140 μm, even more preferably at most 135 μm, even more preferably at most 130 μm, even more preferably at most 125 μm, even more preferably at most 120 μm, even more preferably at most 115 μm, even more preferably at most 110 μm, even more preferably at most 105 μm, even more preferably at most 100 μm. In an even more preferred embodiment, the protein composition has a particle size d90 of between 20 and 200 μm, preferably between 20 and 180 μm, more preferably between 20 and 150 μm, even more preferably between 50 and 150 μm, even more preferably between 55 and 145 μm, even more preferably between 60 and 140 μm, even more preferably between 40 and 130 μm, even more preferably between 60 and 130 μm, even more preferably between 50 and 130 μm even more preferably between 65 and 135 μm, even more preferably between 70 and 130 μm, even more preferably between 75 and 125 μm, even more preferably between 80 and 120 μm, even more preferably between 70 and 120 μm, even more preferably between 80 and 115 μm, even more preferably between 80 and 110 μm, even more preferably between 80 and 105 μm, even more preferably between 80 and 100 μm, even more preferably between 50 and 100 μm. In an even more preferred embodiment, the particle size d90 is about 100 μm.

The applicant has noticed that having a particle size of at most 200 μm, and especially a particle size of at most 100 μm, resulted in improved sensory and textural attributes when the protein composition was added to different foods. Additionally, the ash content of the protein composition was lowered.

In a preferred embodiment, the protein composition has a sugar content of between 0 and 15% dry mass by weight, more preferably between 0 and 14% dry mass by weight, even more preferably between 0 and 13% dry mass by weight, even more preferably between 0 and 12% dry mass by weight, even more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 0 and 7% dry mass by weight, even more preferably between 0 and 6% dry mass by weight, even more preferably between 0 and 5% dry mass by weight, even more preferably between 0 and 4% dry mass by weight, even more preferably between 0 and 3% dry mass by weight, even more preferably between 0 and 2.5% dry mass by weight, even more preferably between 0 and 2% dry mass by weight, even more preferably between 0 and 1.5% dry mass by weight, of said composition.

In a preferred embodiment, the protein composition has a total carbohydrate content of between 0 and 80% dry mass by weight, preferably between 5 and 75% dry mass by weight, more preferably between 10 and 70% dry mass by weight, even more preferably between 15 and 65% dry mass by weight, even more preferably between 20 and 60% dry mass by weight, even more preferably between 25 and 60% dry mass by weight, even more preferably between 30 and 60% dry mass by weight, even more preferably between 35 and 60% dry mass by weight, even more preferably between 40 and 60% dry mass by weight, of said composition.

Preferably, the protein composition has a total carbohydrate content of at most 80% dry mass by weight, more preferably at most 75% dry mass by weight, even more preferably at most 70% dry mass by weight, even more preferably at most 65% dry mass by weight, even more preferably at most 60% dry mass by weight, even more preferably at most 55% dry mass by weight, even more preferably at most 50% dry mass by weight, even more preferably at most 45% dry mass by weight, even more preferably at most 40% dry mass by weight, of said composition. Preferably, the protein composition has a total carbohydrate content of at least 0% dry mass by weight, more preferably at least 5% dry mass by weight, even more preferably at least 10% dry mass by weight, even more preferably at least 15% dry mass by weight, even more preferably at least 20% dry mass by weight, even more preferably at least 25% dry mass by weight, even more preferably at least 30% dry mass by weight, even more preferably at least 35% dry mass by weight, even more preferably at least 40% dry mass by weight, of said composition.

In a preferred embodiment, the protein composition has an ash content of between 0 and 15% dry mass by weight, preferably between 0 and 14% dry mass by weight, more preferably between 0 and 13% dry mass by weight, even more preferably between 0 and 12% dry mass by weight, even more preferably between 0 and 11% dry mass by weight, even more preferably between 0 and 10% dry mass by weight, more preferably between 0 and 9% dry mass by weight, even more preferably between 0 and 8% dry mass by weight, even more preferably between 0 and 7% dry mass by weight, even more preferably between 0 and 6% dry mass by weight, even more preferably between 0 and 5% dry mass by weight, even more preferably between 1 and 5% dry mass by weight, of said composition.

In a preferred embodiment, the protein composition has an alcohol content of 0% dry mass by weight of said composition.

In a preferred embodiment, the protein composition is packaged in a packaging comprising a food grade plastic liner on at least one, preferably on all, inner surfaces. Preferably, the packaging further comprises a multiwall Kraft paper.

An example protein composition of the present invention is a powdery food composition comprising a protein fraction and a fibre fraction, wherein said composition is derived from Brewer's Spent Grain; characterized in that the total amount of said protein and said fibre fraction in said composition lies between 70 and 100% dry mass by weight of said composition, and wherein the ratio of protein and fibre fraction in said composition is between 0.55 and 3, wherein said composition has a starch content of between 0 and 12% dry mass by weight, and wherein said composition has an insoluble fibre content of between 20 and 55%.

The protein composition according to the present invention may also be described with reference to the following numbered clauses:

1. A powdery food composition comprising a protein fraction and a fibre fraction, wherein said composition is derived from a plant material, said plant material being barley, barley malt, a distillery or a brewery by-product, preferably a Brewer's Spent Grain; characterized in that the total amount of said protein and said fibre fraction in said composition is between 70 and 100% dry mass by weight of said composition, and wherein the ratio of protein and fibre fraction in said composition is between 0.7 and 3.50.

2. The composition according to clause 1, wherein the total amount of said protein and said fibre fraction in said composition is between 80 and 100% dry mass by weight of said composition, and wherein the ratio of protein and fibre fraction in said composition is between 0.75 and 1.5.

3. The composition according to any of the preceding clauses 1 or 2, wherein said fibre fraction has an insoluble fibre content of between 80 and 100% dry mass by weight, preferably between 90 and 100% dry mass by weight, even more preferably between 91 and 95% dry mass by weight, of said fibre fraction.

4. The composition according to preceding clause 3, wherein said fibre fraction comprises between 30 and 90% dry mass by weight, preferably between 45 and 75% dry mass by weight, arabinoxylan; between 5 and 55% dry mass by weight, preferably between 15 and 45% dry mass by weight, cellulose; and between 0 and 30% dry mass by weight, preferably between 10 and 20% dry mass by weight, lignin.

5. The composition according to any of the preceding clauses 1 to 4, wherein said fibre fraction has a soluble fibre content of between 0 and 20% dry mass by weight, preferably between 0 and 10% dry mass by weight, even more preferably between 5 and 9% dry mass by weight, of said fibre fraction.

6. The composition according to any of the preceding clauses 1 to 5, wherein said composition has a starch content of between 0 and 12% dry mass by weight, preferably between 0 and 8% dry mass by weight, more preferably between 3 and 7% dry mass by weight, of said composition.

7. The composition according to any of the preceding clauses 1 to 6, wherein said composition comprises a moisture content of at most 10% by weight of said composition.

8. The composition according to any of the preceding clauses 1 to 7, wherein said composition has a fat content of between 0 and 15% dry mass by weight, preferably between 0 and 10% dry mass by weight, more preferably between 0 and 6% dry mass by weight, of said composition.

9. The composition according to any of the preceding clauses 1 to 8, wherein said composition has an insoluble fibre content of between 15 and 60% dry mass by weight, preferably between 30 and 50% dry mass by weight, more preferably between 35 and 45% dry mass by weight, of said composition.

10. The composition according to any of the preceding clauses 1 to 9, wherein said composition has a soluble fibre content of between 0 and 15% dry mass by weight, preferably between 0 and 10% dry mass by weight, more preferably between 1 and 5% dry mass by weight, of said composition.

11. The composition according to any of the preceding clauses 1 to 10, wherein said composition has a particle size distribution d90 of between 20 and 200 µm, preferably between 60 and 130 µm, more preferably between 70 and 120 µm.

12. The composition according to any of the preceding clauses 1 to 11, wherein said composition has a sugar content of between 0 and 15% dry mass by weight, preferably between 0 and 10% dry mass by weight, more preferably between 0 and 5% dry mass by weight, of said composition.

13. The composition according to any of the preceding clauses 1 to 12, wherein said composition has a total carbohydrate content of between 25 and 60% dry mass by weight, preferably between 40 and 50% dry mass by weight, more preferably between 50 and 60% dry mass by weight, of said composition.

14. The composition according to any of the preceding clauses 1 to 13, wherein said composition has an ash content of between 0 and 10% dry mass by weight, preferably between 0 and 7% dry mass by weight, more preferably between 1 and 5% dry mass by weight, of said composition.

15. A powdery food composition comprising a protein fraction and a fibre fraction, wherein said composition is derived from a plant material, said plant material is chosen from a distillery or a brewery by-product, preferably from a Brewer's Spent Grain; characterized in that the total amount of said protein and said fibre fraction in said composition lies between 70 and 100% dry mass by weight of said composition, and wherein the ratio of protein and fibre fraction in said composition is between 0.70 and 3.50, wherein said composition has a starch content of between 0 and 12% dry mass by weight, and wherein said composition has an insoluble fibre content of between 20 and 55% dry mass.

Fibre Composition

The fibre composition of the present invention is produced from brewer's spent grain. The fibre composition:
- is in the form of a powder having a particle size (d90) of between 200 and 500 µm, preferably between 200 and 450 µm, preferably between 250 and 350 µm, as determined by laser diffraction;
- has a total dietary fibre content (% dry matter by weight) of greater than 55%, preferably greater than 60%, as determined by AOAC 991.43;
- has a total insoluble fibre content (% dry matter by weight) of between 55 and 75%, preferably between 60 and 70%, and a total soluble dietary fibre content (% dry matter by weight) of between 0 and 10%, preferably between 0 and 5%, as determined by AOAC 2011.25; and has a total protein content (% dry matter by weight) of between 15 and 30%, preferably between 18 and 25%, as determined by the Kjeldahl method using a conversion factor of 6.25.

The fibre composition of the present invention is also referred to as a powdery food composition comprising a protein fraction and a fibre fraction.

The inventors have observed that such fibre composition is suitable as an ingredient to increases the fibre and protein level in different final food products and the average daily intake of proteins and fibres of the consumers of the food products containing the them. The food products comprising said fibre composition are especially beneficial for increasing the daily fibre intake, which is associated with numerous health benefits such as lowering the fat uptake in the gut, increasing growth for building or repairing tissues (e.g. muscle, bone, cartilage skin or blood), increasing anti-inflammatory properties, increasing gut health (increase in digestion, stimulation of the gut microbiota and normalizing bowel movements), stimulating weight loss and for the maintenance of a healthy physique. The fibre composition is especially advantageous for obtaining final food products which are deemed to be beneficial for people wanting to lose weight or who have a difficult time maintaining a healthy weight, and for diabetic patients or patients suffering from high cholesterol or constipation. Moreover, due to the high fibre content, the addition of a moderate amount of said fibre composition would suffice to increase the fibre content of a final food product and therefore possibly being economically beneficial for the consumer, as well as being beneficial for reducing the chance that the fibre composition could influence the taste of the final food product.

Additionally, the fibre composition is obtained from a product that has been traditionally wasted or used animal feed, pet food or compost after the corresponding brewing process, which is readily available in large quantities throughout the year, making the fibre composition sustainable from an economic and environmental standpoint.

The protein content of said fibre composition can be measured with conventional means in the art, e.g. by Foss equipment based on the Kjeldahl method or with any other suitable method known in the art, such as but not limiting to the Dumas method. The Nitrogen:protein conversion factor used in the Kjeldahl method is 6.25. A suitable method can be found according to BS 4401 Pt 2: 1980.

Preferably, the total amount of said protein and said fibre fraction (i.e. the total combined content of protein and dietary fibre) in said fibre composition is at most 100% dry mass by weight, preferably at most 99% dry mass by weight, more preferably at most 98% dry mass by weight, even more preferably at most 97% dry mass by weight, even more preferably at most 96% dry mass by weight, even more preferably at most 95% dry mass by weight, even more preferably at most 94% dry mass by weight, of said composition.

Preferably, the total amount of said protein and said fibre fraction in said fibre composition is at least 70% dry mass by weight, preferably at least 71% dry mass by weight, more preferably at least 72% dry mass by weight, even more preferably at least 73% dry mass by weight, even more preferably at least 74% dry mass by weight, even more preferably at least 76% dry mass by weight, even more preferably at least 77% dry mass by weight, even more preferably at least 78% dry mass by weight, even more preferably at least 79% dry mass by weight, even more preferably at least 80% dry mass by weight, even more preferably at least 81% dry mass by weight, even more preferably at least 82% dry mass by weight, even more preferably at least 83% dry mass by weight, even more preferably at least 84% dry mass by weight, even more preferably at least 85% dry mass by weight, even more preferably at least 86% dry mass by weight, even more preferably at least 87% dry mass by weight, even more preferably at least 88% dry mass by weight, of said composition, of said composition.

Preferably, the ratio of protein and fibre fraction in said fibre composition is between 0.30 and 0.70 (e.g. 0.30, 0.35, 0.40, 0.45, 0.50, 0.55, 0.60, 0.65, 0.70 or any intermediate value), more preferably between 0.30 and 0.65, even more preferably between 0.30 and 0.60, even more preferably between 0.30 and 0.55, even more preferably between 0.30 and 0.54, even more preferably between 0.30 and 0.53, even more preferably between 0.30 and 0.52, even more preferably between 0.30 and 0.51, even more preferably between 0.30 and 0.50, even more preferably between 0.30 and 0.49, more preferably between 0.31 and 0.49, even more preferably between 0.31 and 0.48, even more preferably between 0.32 and 0.48, even more preferably between 0.32 and 0.47, even more preferably between 0.33 and 0.47, even more preferably between 0.33 and 0.46, even more preferably between 0.34 and 0.46, even more preferably between 0.34 and 0.46, even more preferably between 0.35 and 0.45.

In a particularly preferred embodiment, the total amount of said protein and said fibre fraction in said fibre composition is between 85 and 100% dry mass by weight of said composition. The ratio of protein and fibre fraction in said fibre composition is between 0.30 and 0.55. Said fibre composition is especially beneficial for increasing the fibre content of final food products.

The fibre composition preferably has a total combined content of protein and dietary fibre (% dry matter by weight) of between 70 and 100% (e.g. 70, 75, 80, 85, 90 or 95% or any intermediate value), preferably between 85 and 100%, and a ratio of protein to dietary fibre (dry matter by weight) of between 0.30 and 0.55 (e.g. 0.30, 0.35, 0.40, 0.45, 0.50, 0.55 or any intermediate value), preferably between 0.30 and 0.45, preferably between 0.30 and 0.40, wherein the total dietary fibre content is determined by AOAC 991.43 and the total protein content is determined by the Kjeldahl method using a conversion factor of 6.25.

The bulk density of the fibre composition is preferably from 0.34 to 0.45 g/mL, its tapped density is preferably from 0.42 to 0.60 g/mL and its Hausner index is preferably from 1.15 to 1.34, preferably from 1.20 to 1.24.

In a particularly preferred embodiment, said fibre fraction (i.e. the total dietary fibre content) has an insoluble fibre content of between 80 and 100% dry mass by weight, preferably between 85 and 100% dry mass by weight, more preferably between 90 and 100% dry mass by weight, even more preferably between 91 and 100% dry mass by weight, even more preferably between 92 and 100% dry mass by weight, even more preferably between 93 and 100% dry mass by weight, even more preferably between 94 and 100% dry mass by weight, even more preferably between 95 and 99% dry mass by weight, based on the total weight of the fibre fraction. The fibre composition wherein the fibre fraction comprises mostly insoluble fibre is deemed to lead to final food products which are especially advantageous for improving the bowel movement and for helping with weight loss or with the maintenance of a healthy weight.

In a particularly preferred embodiment, said fibre fraction comprises between 5 and 90% dry mass by weight, preferably between 10 and 90% dry mass by weight, more preferably between 15 and 90% dry mass by weight, even more preferably between 15 and 85% dry mass by weight, even more preferably between 15 and 80% dry mass by weight, even more preferably between 20 and 80% dry mass by weight, even more preferably between 20 and 75% dry mass by weight, more preferably between 25 and 75% dry mass by weight, even more preferably between 25 and 70% dry mass by weight, even more preferably between 25 and 70% dry mass by weight, even more preferably between 30 and 70% dry mass by weight, even more preferably between 35 and 70% dry mass by weight, even more preferably between 35 and 65% dry mass by weight, even more preferably between 35 and 60% dry mass by weight, even more preferably between 40 and 60% dry mass by weight, arabinoxylan, based on the total weight of the fibre fraction. Foods comprising said preferred fibre composition are deemed to be especially beneficial for improving the immunomodular activity, the cholesterol lowering activity, the absorption of minerals, the attenuation of type II diabetes and the prebiotics effect.

Preferably, said fibre fraction comprises at most 90% dry mass by weight, more preferably at most 90% dry mass by weight, even more preferably at most 85% dry mass by weight, even more preferably at most 80% dry mass by weight, even more preferably at most 75% dry mass by weight, even more preferably at most 70% dry mass by weight, even more preferably at most 65% dry mass by weight, even more preferably at most 60% dry mass by weight, arabinoxylan, based on the total weight of the fibre fraction. Preferably, said fibre fraction comprises at least 5% dry mass by weight, more preferably at least 10% dry mass by weight, even more preferably at least 15% dry mass by weight, even more preferably at least 20% dry mass by weight, even more preferably at least 25% dry mass by weight, even more preferably at least 30% dry mass by weight, even more preferably at least 35% dry mass by weight, even more preferably at least 40% dry mass by weight, even more preferably at least 45% dry mass by weight, arabinoxylan, based on the total weight of the fibre fraction.

In a particularly preferred embodiment, said fibre fraction comprises between 0 and 70% dry mass by weight, preferably between 5 and 70% dry mass by weight, more preferably between 5 and 65% dry mass by weight, even more preferably between 10 and 65% dry mass by weight, even more preferably between 15 and 65% dry mass by weight, even more preferably between 15 and 60% dry mass by weight, even more preferably between 20 and 60% dry mass by weight, even more preferably between 20 and 55% dry mass by weight, even more preferably between 25 and 55% dry mass by weight, even more preferably between 25 and 50% dry mass by weight, even more preferably between 20 and 50% dry mass by weight, cellulose, based on the total weight of the fibre fraction.

Preferably, said fibre fraction comprises at most 70% dry mass by weight, more preferably at most 65% dry mass by weight, even more preferably at most 60% dry mass by weight, even more preferably at most 55% dry mass by weight, even more preferably at most 50% dry mass by weight, even more preferably at most 45% dry mass by weight, even more preferably at most 40% dry mass by weight, cellulose, based on the total weight of the fibre fraction. Preferably, said fibre fraction comprises at least 5% dry mass by weight, more preferably at least 8% dry mass by weight, even more preferably at least 10% dry mass by weight, even more preferably at least 12% dry mass by weight, even more preferably at least 14% dry mass by weight, even more preferably at least 16% dry mass by weight, even more preferably at least 18% dry mass by weight, even more preferably at least 20% dry mass by weight, even more preferably at least 22% dry mass by weight, even more preferably at least 24% dry mass by weight, even more preferably at least 26% dry mass by weight, even more preferably at least 28% dry mass by weight, even more preferably at least 30% dry mass by weight, cellulose, based on the total weight of the fibre fraction.

In a particularly preferred embodiment, said fibre fraction comprises between 0 and 50% dry mass by weight, preferably between 0 and 45% dry mass by weight, more preferably between 0 and 40% dry mass by weight, even more preferably between 0 and 35% dry mass by weight, even more preferably between 0 and 33% dry mass by weight, even more preferably between 3 and 33% dry mass by weight, even more preferably between 5 and 30% dry mass by weight, even more preferably between 5 and 25% dry mass by weight, even more preferably between 10 and 25% dry mass by weight, even more preferably between 10 and 23% dry mass by weight, even more preferably between 13 and 23% dry mass by weight, even more preferably between 13 and 21% dry mass by weight, even more preferably between 15 and 21% dry mass by weight, lignin, based on the total weight of the fibre fraction.

Preferably, said fibre fraction comprises at most 70% dry mass by weight, more preferably at most 65% dry mass by weight, even more preferably at most 60% dry mass by weight, even more preferably at most 55% dry mass by weight, even more preferably at most 50% dry mass by weight, even more preferably at most 45% dry mass by weight, even more preferably at most 40% dry mass by weight, even more preferably at most 35% dry mass by weight, even more preferably at most 30% dry mass by weight, even more preferably at most 25% dry mass by weight, even more preferably at most 20% dry mass by weight, lignin, based on the total weight of the fibre fraction. Preferably, said fibre fraction comprises at least 2% dry mass by weight, more preferably at least 4% dry mass by weight, even more preferably at least 6% dry mass by weight, even more preferably at least 8% dry mass by weight, even more preferably at least 10% dry mass by weight, even more preferably at least 12% dry mass by weight, even more preferably at least 14% dry mass by weight, even more preferably at least 15% dry mass by weight, even more preferably at least 16% dry mass by weight, lignin, based on the total weight of the fibre fraction.

In a particularly preferred embodiment, said fibre fraction has a soluble fibre content of between 0 and 20% dry mass by weight, preferably between 0 and 19% dry mass by weight, even more preferably between 0 and 18% dry mass by weight, even more preferably between 0 and 17% dry mass by weight, even more preferably between 0 and 16% dry mass by weight, even more preferably between 0 and 15% dry mass by weight, even more preferably between 0 and 14% dry mass by weight, even more preferably between 0 and 13% dry mass by weight, even more preferably between 0 and 12% dry mass by weight, even more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 0 and 7% dry mass by weight, even more preferably between 0 and 6% dry mass by weight, even more preferably between 0 and 5% dry mass by weight, even more preferably between 0 and 4% dry mass by weight, even more preferably between 0 and 3% dry mass by weight, based on the total weight of the fibre fraction.

In a preferred embodiment, the fibre composition has an amino acid content of between 0 and 60% dry mass by weight, preferably between 0 and 50% dry mass by weight, more preferably between 0 and 45% dry mass by weight, even more preferably between 0 and 40% dry mass by weight, even more preferably between 1 and 39% dry mass by weight, even more preferably between 2 and 38% dry mass by weight, even more preferably between 3 and 37% dry mass by weight, even more preferably between 4 and 36% dry mass by weight, even more preferably between 5 and 35% dry mass by weight, even more preferably between 6 and 34% dry mass by weight, even more preferably between 7 and 33% dry mass by weight, even more preferably between 8 and 32% dry mass by weight, of said composition. In a more preferred embodiment, the fibre composition has an amino acid content of between 14 and 26% dry mass by weight, more preferably between 15 and 25% dry mass by weight, even more preferably between 16 and 24% dry mass by weight, even more preferably between 17 and 23% dry mass by weight, even more preferably between 18 and 22% dry mass by weight, even more preferably between 19 and 21% dry mass by weight, of said composition.

In a particularly preferred embodiment, the fibre composition has an essential amino acid content of between 0 and 25% dry mass by weight, more preferably between 0 and 20% dry mass by weight, even more preferably between 0 and 15% dry mass by weight, even more preferably between 0 and 10% dry mass by weight, even more preferably between 4 and 10% dry mass by weight, of said composition; a conditionally essential amino acid content of between 0 and 20% dry mass by weight, more preferably between 0 and 15% dry mass by weight, even more preferably between 0 and 10% dry mass by weight, even more preferably between 0 and 8% dry mass by weight, even more preferably between 2 and 8% dry mass by weight, of said composition; and a non-essential amino acid content of between 0 and 25% dry mass by weight, more preferably between 0 and 20% dry mass by weight, even more preferably between 0 and 15% dry mass by weight, even more preferably between 0 and 10% dry mass by weight, even more preferably between 4 and 10% dry mass by weight, of said composition.

In a preferred embodiment, the fibre composition has a starch content of between 0 and 10% dry mass by weight, preferably between 0 and 9% dry mass by weight, more preferably between 0 and 8% dry mass by weight, even more preferably between 0 and 7.5% dry mass by weight, even more preferably between 0 and 7% dry mass by weight, even more preferably between 0 and 6% dry mass by weight, even more preferably between 0 and 5% dry mass by weight, even more preferably between 0 and 4% dry mass by weight, even more preferably between 0 and 3% dry mass by weight, even more preferably between 0 and 2% dry mass by weight, even more preferably between 0 and 1% dry mass by weight, of said composition. By ensuring that the fibre composition does not comprise a starch content of more than 10% dry mass by weight, the fibre composition is especially suitable for obtaining final food products comprising a low starch level, which are deemed to be beneficial for reducing the insulin levels, improving weight management and reducing risk of heart disease.

In a preferred embodiment, the fibre composition comprises a moisture content of at most 10% by weight of said composition. A moisture content of at most 10% by weight is beneficial for improving the shelf-life of the fibre composition, more particularly for improving the time before the fibre composition becomes lumpy and therefore hard to dissolve, and/or before the fibre composition becomes contaminated. Lower moisture levels improved the shelf-life even more. An improved shelf-life is beneficial for the storage of the fibre composition.

Preferably, the fibre composition comprises a moisture content of at most 10% by weight, preferably of at most 9% by weight, more preferably of at most 8% by weight, even more preferably of at most 7% by weight, even more preferably of at most 6% by weight, even more preferably of at most 5% by weight, even more preferably of at most 4% by weight, even more preferably of at most 3% by weight, even more preferably of at most 2% by weight, even more preferably of at most 1% by weight, of said composition. Preferably, the fibre composition comprises a moisture content of between 0 and 10% by weight, more preferably between 0 and 9% by weight, even more preferably between 0 and 8% by weight, even more preferably between 0 and 7% by weight, even more preferably between 0 and 6% by weight, even more preferably between 0 and 5% by weight, even more preferably between 0 and 4% by weight, even more preferably between 0 and 3% by weight, even more preferably between 0 and 2% by weight, even more preferably between 0 and 1% by weight, of said composition.

In a preferred embodiment, the fibre composition has a fat content of between 0 and 15% dry mass by weight, more preferably between 0 and 14% dry mass by weight, even more preferably between 0 and 13% dry mass by weight, even more preferably between 0 and 12% dry mass by weight, even more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 1 and 8% dry mass by weight, even more preferably between 2 and 8% dry mass by weight, even more preferably between 3 and 8% dry mass by weight, even more preferably between 4 and 8% dry mass by weight, of said composition. The fibre composition is beneficial for obtaining final food products comprising a lower fat content. Food products having a low fat content are deemed to be beneficial for weight loss and lowering the risk of obtaining heart disease, high cholesterol and diabetes.

In a preferred embodiment, the fibre composition has an insoluble fibre content of between 20 and 90% dry mass by weight, more preferably between 30 and 90% dry mass by weight, even more preferably between 35 and 85% dry mass by weight, even more preferably between 36 and 84% dry mass by weight, even more preferably between 37 and 83% dry mass by weight, even more preferably between 38 and 82% dry mass by weight, even more preferably between 39 and 81% dry mass by weight, even more preferably between 40 and 80% dry mass by weight, even more preferably between 41 and 80% dry mass by weight, even more preferably between 42 and 80% dry mass by weight, even more preferably between 43 and 80% dry mass by weight, even more preferably between 44 and 80% dry mass by weight, even more preferably between 45 and 80% dry mass by weight, even more preferably between 46 and 80% dry mass by weight, even more preferably between 47 and 80% dry mass by weight, even more preferably between 48 and 80% dry mass by weight, even more preferably between 49 and 80% dry mass by weight, even more preferably between 50 and 80% dry mass by weight, even more preferably between 51 and 79% dry mass by weight, even more preferably between 52 and 78% dry mass by weight, even more preferably between 53 and 77% dry mass by weight, even more preferably between 54 and 76% dry mass by weight, even more preferably between 55 and 75% dry mass by weight, even more preferably between 56 and 74% dry mass by weight, even more preferably between 57 and 73% dry mass by weight, even more preferably between 58 and 72% dry mass by weight, even more preferably between 59 and 71% dry mass by weight, even more preferably between 60 and 70% dry mass by weight, of said composition.

In a preferred embodiment, the fibre composition has a soluble fibre content of between 0 and 15% dry mass by weight, more preferably between 0 and 14% dry mass by weight, even more preferably between 0 and 13% dry mass by weight, even more preferably between 0 and 12% dry mass by weight, more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 0 and 7% dry mass by weight, even more preferably between 0 and 6% dry mass by weight, even more preferably between 0 and 5% dry mass by weight, even more preferably between 0 and 4% dry mass by weight, even more preferably between 0 and 3% dry mass by weight, of said composition.

In a preferred embodiment, the fibre composition has an iron content of from 9 to 15 mg (for example 9, 10, 11, 12, 13, 14 or 15 mg, or any intermediate value), preferably from 10 to 14 mg, per 100 g (dry matter) of the fibre composition.

In a preferred embodiment, the fibre composition has a particle size d90 (as measured by laser diffraction) of at most 700 μm, more preferably at most 650 μm, even more preferably at most 600 μm, even more preferably at most 550 μm, even more preferably at most 500 μm, even more preferably at most 450 μm, even more preferably at most 400 μm, even more preferably at most 380 μm, even more preferably at most 360 μm, even more preferably at most 340 μm, even more preferably at most 320 μm, even more preferably at most 310 μm, even more preferably at most 300 μm.

In a preferred embodiment, the fibre composition has a particle size (d90) of at least 50 μm, more preferably of at least 55 μm, even more preferably of at least 60 μm, even more preferably of at least 65 μm, even more preferably of at least 70 μm, even more preferably of at least 75 μm, even more preferably of at least 80 μm, even more preferably of at least 85 μm, even more preferably of at least 90 μm, even more preferably of at least 95 μm, even more preferably of at least 100 μm, even more preferably of at least 105 μm, even more preferably of at least 110 μm, even more preferably of at least 120 μm, even more preferably of at least 130 μm, even more preferably of at least 140 μm, even more preferably of at least 150 μm, even more preferably of at least 160 μm, even more preferably of at least 170 μm, even more preferably of at least 180 μm, even more preferably of at least 190 μm, even more preferably of at least 200 μm, even more preferably of at least 210 μm, even more preferably of at least 220 μm, even more preferably of at least 230 μm, even more preferably of at least 240 μm, even more preferably of at least 250 μm, even more preferably of at least 260 μm, even more preferably of at least 270 μm, even more preferably of at least 280 μm, even more preferably of at least 290 μm, even more preferably of at least 300 μm.

In a preferred embodiment, the fibre composition has a particle size d90 of between 50 and 700 μm, more preferably between 100 and 700 μm, even more preferably between 50 and 600 μm, even more preferably between 55 and 550 μm, even more preferably between 60 and 500 μm, even more preferably between 60 and 450 μm, even more preferably between 65 and 400 μm, even more preferably between 70 and 350 μm, even more preferably between 75 and 300. In an even more preferred embodiment, the fibre composition has a particle size distribution d90 of between 100 and 500 μm, preferably between 150 and 450 μm, more preferably between 200 and 500 μm, more preferably between 200 and 450 μm, even more preferably between 200 and 400 μm, even more preferably between 250 and 350 μm, even more preferably the fibre composition has a particle size d90 of about 300 μm.

In a preferred embodiment, the fibre composition has a sugar content of between 0 and 15% dry mass by weight, more preferably between 0 and 14% dry mass by weight, even more preferably between 0 and 13% dry mass by weight, even more preferably between 0 and 12% dry mass by weight, more preferably between 0 and 11% dry mass by weight, even more preferably between 0 and 10% dry mass by weight, even more preferably between 0 and 9% dry mass by weight, even more preferably between 0 and 8% dry mass by weight, even more preferably between 0 and 7% dry mass by weight, even more preferably between 0 and 6% dry mass by weight, even more preferably between 0 and 5% dry mass by weight, even more preferably between 0 and 4% dry mass by weight, even more preferably between 0 and 3% dry mass by weight, even more preferably between 0 and 2% dry mass by weight, of said composition.

In a preferred embodiment, the fibre composition has a total carbohydrate content of at most 95% dry mass by weight, preferably at most 90% dry mass by weight, more preferably at most 89% dry mass by weight, even more preferably at most 88% dry mass by weight, even more preferably at most 87% dry mass by weight, even more preferably at most 86% dry mass by weight, even more preferably at most 85% dry mass by weight, even more preferably at most 84% dry mass by weight, even more preferably at most 83% dry mass by weight, even more preferably at most 82% dry mass by weight, even more preferably at most 81% dry mass by weight, even more preferably at most 80% dry mass by weight, even more preferably at most 79% dry mass by weight, even more preferably at most 78% dry mass by weight, even more preferably at most 77% dry mass by weight, even more preferably at most 76% dry mass by weight, even more preferably at most 75% dry mass by weight, even more preferably at most 74% dry mass by weight, even more preferably at most 73% dry mass by weight, even more preferably at most 72% dry mass by weight, even more preferably at most 71% dry mass by weight, even more preferably at most 70% dry mass by weight, of said composition.

In a preferred embodiment, the fibre composition has a total carbohydrate content of at least 40% dry mass by weight, preferably at least 41% dry mass by weight, more preferably at least 42% dry mass by weight, even more preferably at least 43% dry mass by weight, even more preferably at least 44% dry mass by weight, even more preferably at least 45% dry mass by weight, even more preferably at least 46% dry mass by weight, even more preferably at least 47% dry mass by weight, even more preferably at least 48% dry mass by weight, even more preferably at least 49% dry mass by weight, even more preferably at least 50% dry mass by weight, even more preferably at least 51% dry mass by weight, even more preferably at least 52% dry mass by weight, even more preferably at least 53% dry mass by weight, even more preferably at least 54% dry mass by weight, even more preferably at least 55% dry mass by weight, even more preferably at least 56% dry mass by weight, even more preferably at least 57% dry mass by weight, even more preferably at least 58% dry mass by weight, even more preferably at least 59% dry mass by weight, even more preferably at least 60% dry mass by weight, even more preferably at least 61% dry mass by weight, even more preferably at least 62% dry mass by weight, even more preferably at least 63% dry mass by weight, of said composition.

In a particularly preferred embodiment, the fibre composition has a total carbohydrate content of between 50 and 95% dry mass by weight, preferably between 50 and 90% dry mass by weight, more preferably between 50 and 85% dry mass by weight, even more preferably between 50 and 80% dry mass by weight, even more preferably between 55 and 80% dry mass by weight, even more preferably between 55 and 75% dry mass by weight, more preferably between 60 and 70% dry mass by weight, of said composition.

In a preferred embodiment, the fibre composition has an ash content of between 0 and 15% dry mass by weight, preferably between 0 and 10% dry mass by weight, more preferably between 0 and 9% dry mass by weight, even more preferably between 0 and 8% dry mass by weight, even more preferably between 1 and 8% dry mass by weight, even more preferably between 2 and 8% dry mass by weight, even more preferably between 2 and 7% dry mass by weight, even more preferably between 3 and 6% dry mass by weight, of said composition.

In a preferred embodiment, the fibre composition has an alcohol content of 0% dry mass by weight of said composition.

In a preferred embodiment, the fibre composition is packaged in a packaging comprising a food grade plastic liner on at least one, preferably on all, inner surfaces. Preferably, the packaging further comprises a multiwall Kraft paper.

An example fibre composition of the present invention is a powdery food composition comprising a protein fraction and a fibre fraction, wherein said composition is derived from Brewer's Spent Grain; characterized in that the total amount of said protein and said fibre fraction in said composition lies between 70 and 100% dry mass by weight of said composition, and wherein the ratio of protein and fibre fraction in said composition is between 0.30 and 0.65, wherein said composition has a starch content of between 0 and 7.5% dry mass by weight, and wherein said composition has an insoluble fibre content of between 40 and 80% dry mass by weight.

The fibre composition according to the present invention may also be described with reference to the following numbered clauses:

1. A powdery food composition comprising a protein fraction and a fibre fraction, wherein said composition is derived from a plant material, said plant material being barley, barley malt or distillery or a brewery by-product, preferably a Brewer's Spent Grain; characterized in that the total amount of said protein and said fibre fraction in said composition is between 70 and 100% dry mass by weight of said composition, and wherein the ratio of protein and fibre fraction in said composition is between 0.30 and 0.70.

2. The composition according to clause 1, wherein the total amount of said protein and said fibre fraction in said composition is between 85 and 100% dry mass by weight of said composition, and wherein the ratio of protein and fibre fraction in said composition is between 0.30 and 0.55.

3. The composition according to any of the preceding clauses 1 or 2, wherein said fibre fraction has an insoluble fibre content of between 80 and 100% dry mass by weight, preferably between 90 and 100% dry mass by weight, even more preferably between 95 and 99% dry mass by weight, of said fibre fraction.

4. The composition according to preceding clause 3, wherein said fibre fraction comprises between 20 and 80% dry mass by weight, preferably between 35 and 65% dry mass by weight, arabinoxylan; between 15 and 65% dry mass by weight, preferably between 25 and 55% dry mass by weight, cellulose; and between 3 and 33% dry mass by weight, preferably between 13 and 23% dry mass by weight, lignin.

5. The composition according to any of the preceding clauses 1 to 4, wherein said fibre fraction has a soluble fibre content of between 0 and 20% dry mass by weight, preferably between 0 and 10% dry mass by weight, even more preferably between 0 and 5% dry mass by weight, of said fibre fraction.

6. The composition according to any of the preceding clauses 1 to 5, wherein said composition has a starch content of between 0 and 7.5% dry mass by weight, preferably between 0 and 5% dry mass by weight, more preferably between 0 and 3% dry mass by weight, of said composition.

7. The composition according to any of the preceding clauses 1 to 6, wherein said composition comprises a moisture content of at most 10% by weight of said composition.

8. The composition according to any of the preceding clauses 1 to 7, wherein said composition has a fat content of between 0 and 15% dry mass by weight, preferably between 0 and 10% dry mass by weight, more preferably between 0 and 6% dry mass by weight, of said composition.

9. The composition according to any of the preceding clauses 1 to 8, wherein said composition has an insoluble fibre content of between 45 and 85% dry mass by weight, preferably between 55 and 75% dry mass by weight, more preferably between 60 and 70% dry mass by weight, of said composition.

10. The composition according to any of the preceding clauses 1 to 9, wherein said composition has a soluble fibre content of between 0 and 10% dry mass by weight, preferably between 0 and 7% dry mass by weight, more preferably between 0 and 3% dry mass by weight, of said composition.

11. The composition according to any of the preceding clauses 1 to 10, wherein said composition has a particle size distribution d90 of between 100 and 700 μm, preferably between 200 and 500 μm, more preferably between 250 and 350 μm.

12. The composition according to any of the preceding clauses 1 to 11, wherein said composition has a sugar content of between 0 and 15% dry mass by weight, preferably between 0 and 10% dry mass by weight, more preferably between 0 and 5% dry mass by weight, of said composition.

13. The composition according to any of the preceding clauses 1 to 12, wherein said composition has a total carbohydrate content of between 50 and 85% dry mass by weight, preferably between 55 and 75% dry mass by weight, more preferably between 60 and 70% dry mass by weight, of said composition.

14. The composition according to any of the preceding clauses 1 to 13, wherein said composition has an ash content of between 0 and 10% dry mass by weight, preferably between 0 and 7.5% dry mass by weight, more preferably between 1 and 5% dry mass by weight, of said composition.

15. A powdery food composition comprising a protein fraction and a fibre fraction, wherein said composition is derived from a plant material, said plant material is chosen from a distillery or a brewery by-product, preferably from a Brewer's Spent Grain; characterized in that the total amount of said protein and said fibre fraction in said composition lies between 70 and 100% dry mass by weight of said composition, and wherein the ratio of protein and fibre fraction in said composition is between 0.30 and 0.65, wherein said composition has a starch content of between 0 and 5% dry mass by weight, and wherein said composition has an insoluble fibre content of between 40 and 80% dry mass by weight.

EXAMPLES

The present invention will now be further exemplified with reference to the following examples. The present invention is in no way limited to the given examples or to the embodiments presented in the figures.

Example 1 (Reference)

Milling technologies were evaluated using the following types of mill:
A pin mill (100 UPZ, Hosokawa-Alpine®, equipped with pin discs)
A beater mill (100 UPZ, Hosokawa-Alpine®, equipped with beater disc)
An impact (ZPS) mill (70 ZPS, Hosokawa-Alpine®)
An attrition mill (ATM8 Attrition Mill, Poittermill)
A counter rotating pin mill (CW250 Alpine CW Contraplex Pin Mill, Hosokawa Micron Powder Systems)

Representative samples of dried BSG were coarsely ground to remove agglomerates present after the drying process using a knife mill (SM300, Retsch®) and then used for the evaluation.

The impact (ZPS) mill was not able to effectively mil the fibrous material into a low particle size powder suitable for fractionation. Similarly, the beater mill was not able to produce a sufficiently fine powder. The pin mill, attrition mill and counter rotating pin mill were all effective and able to produce desired bimodal particle size distributions using different milling principles.

Example 2 (Reference)

The attrition mill and counter rotating pin mill of Example 1 were used in combination with an air classifier (70 ATP Classifier, Hosokawa-Alpine®).

The attrition mill rotation speed was set to 50 Hz, providing an evaporative capacity of 50 kg/h. The retention time in the equipment was monitored to obtain a powder with a d90 of 200-300 μm.

The counter rotating pin mill was set to 6500, 8000 or 9400 rpm each rotor.

The air classifier was set at 100 m³/h air flow and a rotation speed of 3000 rpm, 3500 rpm or 5000 rpm. The feed rate was set at 9 kg/h.

The particle size distributions of the powder obtained after attrition milling and after subsequent air classification of the attrition milled powder at 5000 rpm is shown in FIG. 1.

Figure 2:
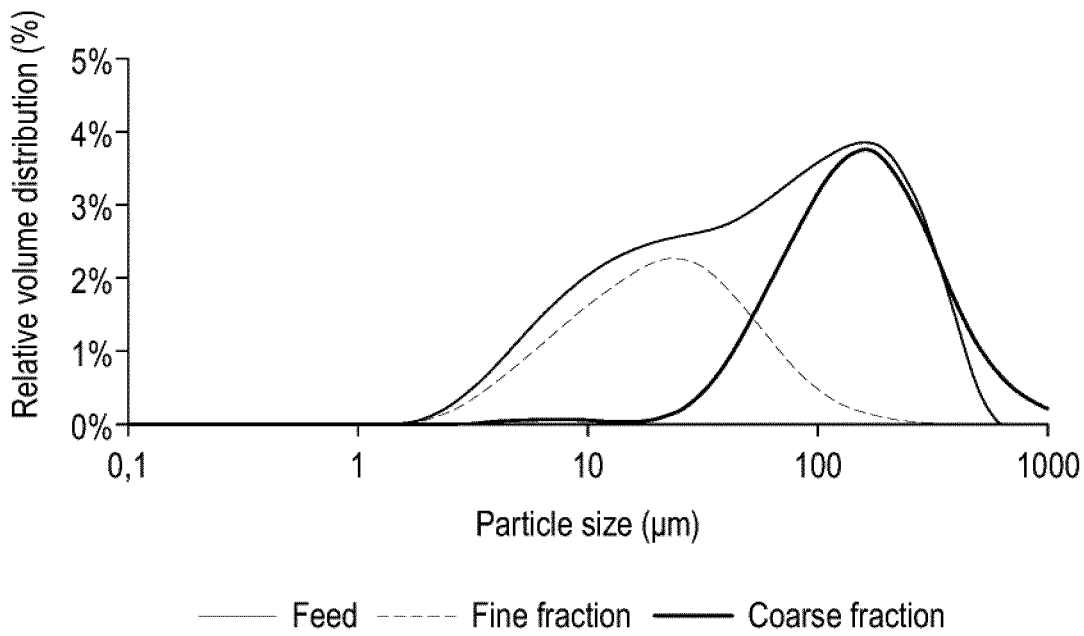
FIG. 2 shows the particle size distributions of the powder obtained in Example 2 after counter rotating pin milling and subsequent air classification of the pin milled powder.

The particle size distributions of the powder obtained after counter rotating pin milling (9400 rpm each rotor) and after subsequent air classification of the pin milled powder at 5000 rpm is shown in FIG. 2.

Figure 3:
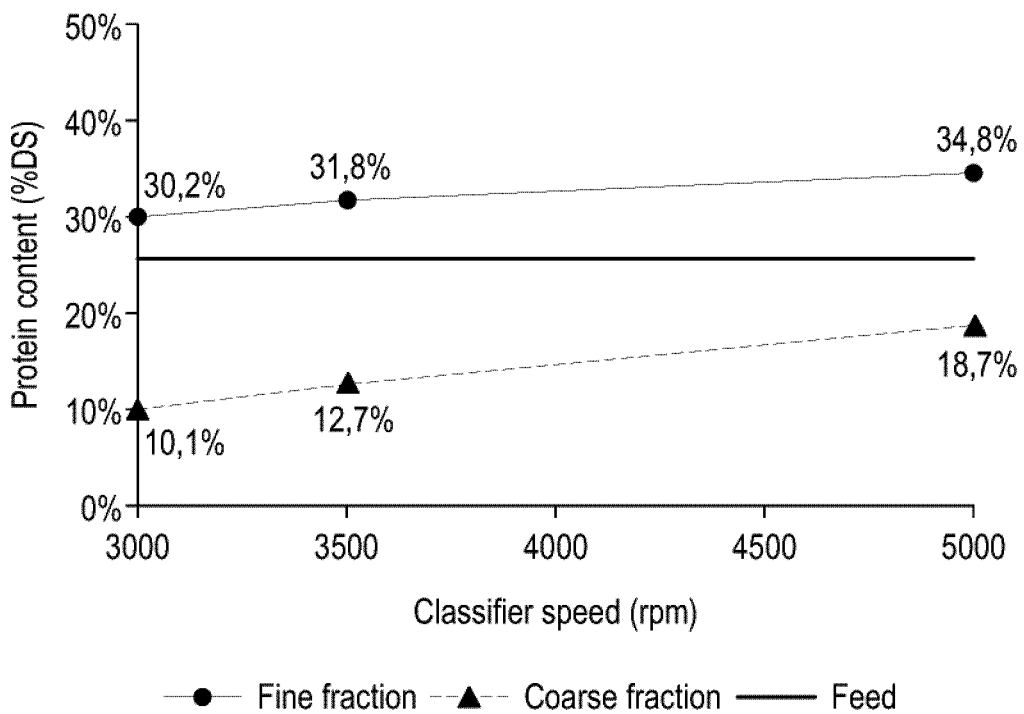
FIG. 3 shows the protein content (% dry matter) of the coarse and fine fractions obtained in Example 2 by attrition milling and subsequent air classification of the attrition milled powder.

The protein content (% dry matter; as determined by the Kjeldahl method; conversion factor 6.25) of the coarse and fine fractions obtained by attrition milling and subsequent air classification of the attrition milled powder at 5000 rpm is shown in FIG. 3.

Figure 4:
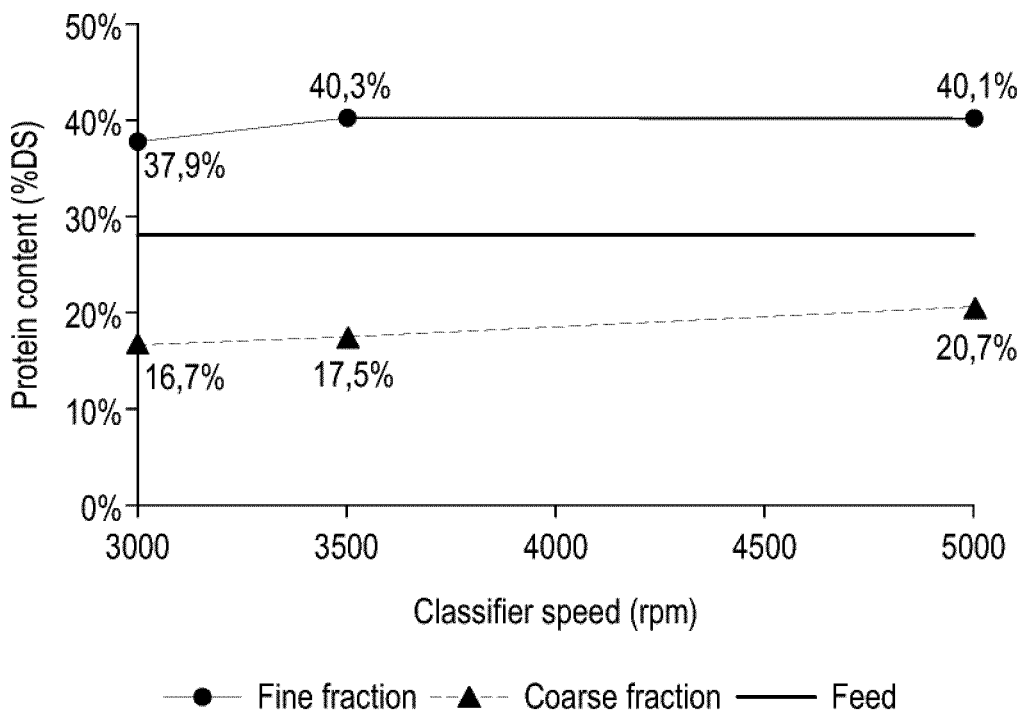
FIG. 4 shows the protein content (% dry matter) of the coarse and fine fractions obtained in Example 2 by counter rotating pin milling and subsequent air classification of the pin milled powder.

The protein content (% dry matter; as determined by the Kjeldahl method; conversion factor 6.25) of the coarse and fine fractions obtained by counter rotating pin milling and subsequent air classification of the pin milled powder is shown in FIG. 4.

It can be seen from FIGS. 1-4 that the combination of a pin mill, particularly a counter rotating pin mill, and an air classifier, achieves surprisingly better separation into high protein (fine) and low protein/high fibre (coarse) fractions.

Examples 3-10

Preparation of Samples:
Wet BSG comprising spent barley was sourced from a brewery. The BSG was dried, milled and fractionated into a fine composition and a coarse composition.

The drying process was carried out using a tray oven to a moisture content of 10% or less. Wet BSG was placed in the oven and the moisture level was monitored until a level of 10% or less was reached.

The milling was carried out using a counter rotating pin mill CW250 Alpine CW Contraplex Pin Mill, Hosokawa Micron Powder Systems) set to 6500, 8000 or 9400 rpm each rotor.

The fractionating was carried out using an air classifier (70 ATP Classifier, Hosokawa-Alpine®) set at 100 m³/h air flow and a rotation speed of 3000 rpm, 3500 rpm or 5000 rpm. The feed rate was set at 9 kg/h.

Analytical Methods:
The total dietary fibre content was determined following the AOAC Official Method 2011.25 to determine insoluble, soluble, and total dietary fibre in foods, by de-sugaring and defatting a sample. The sample was further subjected to an enzymatic digestion by heat stable α-amylase, protease and amyloglucosidase to remove starch and protein. The insoluble dietary fibre content was filtered, washed, dried and weighed. The residue was split, one portion was tested for protein content and the other was tested for the determination of the ash content. The insoluble dietary fibre content was determined gravimetrically after correction for protein, ash and blank. For soluble fibre, the filtrate was precipitated with alcohol to determine gravimetrically the water:alcohol insoluble fibre; and nonprecipitable water:alcohol soluble fibre was filtrated, deionized, concentrated and determined by liquid chromatography.

The protein content was determined by digesting a sample with a mixture of concentrated sulphuric acid and potassium sulphate using copper (II) sulphate as a catalyst, converting organic nitrogen present to ammonium sulphate. Excess sodium hydroxide was automatically added to the cooled digest to liberate ammonia from the ammonium sulphate. The ammonia was auto-distilled into an excess of auto-dispensed indicator boric acid solution, then auto-titrated with standard sulphuric acid solution. The nitrogen content of the sample was calculated from the amount of ammonia produced. The quantity of nitrogen was measured as ammonia produced and determined under the conditions specified in this procedure and expressed in appropriate units. The percentage nitrogen content determined as above multiplied by the relevant factor (6.25) was expressed as a percentage by mass of protein.

The total amount of the protein and the fibre fraction was calculated by the summation of the protein fraction and the fibre fraction. The ratio of the protein and the fibre fraction was calculated by dividing the protein fraction by the fibre fraction.

The fat content was determined by gravimetry after an acid hydrolysis and a subsequent sample digestion with hydrochloric acid. After this step, the sample was filtered, dried and extracted with petroleum ether.

The total carbohydrates fraction was obtained by obtaining the total mass and subtracting the moisture content, the ash content, the fat content and the protein content from the total mass.

The starch content was obtained by subtracting the total dietary fibre fraction from the total carbohydrates fraction.

Example 3

An analysis was performed on the fine and coarse compositions. The total dietary fibre fraction, the protein fraction, the fat content and the ash content were determined and expressed in % dry mass by weight. Additionally, the total amount of the protein and the fibre fraction and the ratio of the protein and the fibre fraction were calculated.

The obtained values for nine different samples of the fine composition (1f-9f) and eight different samples of the coarse composition (1c-8c) are illustrated in Tables 1a and 1b.

TABLE 2-continued

| | Other flours, seeds and brans | | | | |
|---|---|---|---|---|---|
| Sample identification | Total Dietary Fibre | Protein | Fat | SUM (protein + fibre) | Ratio protein/ fibre |
| Oat flour | 6.5 | 14.66 | 9.12 | 21.16 | 2.26 |
| Barley flour | 10.1 | 10.5 | 1.6 | 20.60 | 1.04 |
| Wheat flour, white | 2.7 | 10.33 | 0.98 | 13.03 | 3.83 |
| Wheat flour, whole grain | 12.2 | 13.7 | 1.87 | 25.90 | 1.12 |
| Quinoa flour | 7 | 14.12 | 6.07 | 21.12 | 2.02 |
| Rice flour, brown | 4.6 | 7.23 | 2.78 | 11.83 | 1.57 |
| Rice flour, white | 2.4 | 5.95 | 1.42 | 8.35 | 2.48 |
| Flax seed | 27.3 | 18.29 | 42.16 | 45.59 | 0.67 |
| Chia seed | 37.7 | 15.6 | 30.8 | 53.3 | 0.41 |

From Table 2 it is clear that none of the compared flours, brans or seeds has a total amount of a protein and a fibre fraction between 70 and 100% dry mass by weight, none has a ratio of the protein and the fibre fraction between 0.70 and 3.50, and none has a ratio of the protein and the fibre fraction between 0.30 and 0.70.

TABLE 1a

| | Analysis for fine composition | | | | | | | | |
|---|---|---|---|---|---|---|---|---|---|
| Sample identification | Sample 1f | Sample 2f | Sample 3f | Sample 4f | Sample 5f | Sample 6f | Sample 7f | Sample 8f | Sample 9f |
| Total Dietary Fibre | 42.35 | 48 | 39.78 | 44.64 | 46.95 | 45.32 | 20.04 | 25.76 | 43.3 |
| Protein | 32.01 | 33.45 | 50.77 | 45.22 | 36.9 | 36.16 | 68.07 | 49.51 | 39.1 |
| Fat | 11.85 | 10.75 | 3.48 | 3.91 | 5.82 | 9.34 | 5.48 | 7.74 | 8.32 |
| Ash | 4.85 | 4.1 | 2.1 | 4.07 | 3.31 | 3.41 | 3.93 | 3.58 | 4.54 |
| Protein + fibre | 74.36 | 81.45 | 90.55 | 89.86 | 83.85 | 81.48 | 88.11 | 75.27 | 82.4 |
| Ratio protein/fibre | 0.76 | 0.70 | 1.28 | 1.01 | 0.79 | 0.80 | 3.40 | 1.92 | 0.90 |

TABLE 1b

| | Analysis for coarse composition | | | | | | | |
|---|---|---|---|---|---|---|---|---|
| Sample identification | Sample 1c | Sample 2c | Sample 3c | Sample 4c | Sample 5c | Sample 6c | Sample 7c | Sample 8c |
| Total Dietary Fibre | 58.47 | 72.35 | 51.99 | 70.84 | 67.39 | 62.94 | 69.25 | 67.67 |
| Protein | 18.78 | 22.09 | 28.25 | 25.65 | 23.95 | 26.15 | 22.14 | 27.94 |
| Fat | 9.54 | 0.22 | 8.12 | 3.91 | 4.83 | 6.81 | 6.45 | 0.97 |
| Ash | 4.77 | 3.34 | 5.94 | 1.48 | 4.43 | 4.21 | 1.25 | 2.78 |
| SUM protein + fibre | 77.25 | 94.44 | 80.24 | 96.49 | 91.34 | 89.09 | 91.39 | 95.61 |
| Ratio protein/fibre | 0.32 | 0.31 | 0.54 | 0.36 | 0.36 | 0.42 | 0.32 | 0.41 |

Example 4 (Comparative)

Other powdery compositions and seeds or brans were analyzed. The obtained values are illustrated in Table 2.

TABLE 2

| | Other flours, seeds and brans | | | | |
|---|---|---|---|---|---|
| Sample identification | Total Dietary Fibre | Protein | Fat | SUM (protein + fibre) | Ratio protein/ fibre |
| Faba bean flour | 7 | 25 | | 32 | 3.57 |
| Oat bran (google) | 15 | 17 | 7 | 32 | 1.13 |
| wheat bran | 43 | 16 | 3 | 59 | 0.37 |

Example 5

General analysis was performed on the fine and coarse compositions. Tables 3a and 3b illustrate the obtained results.

TABLE 3a

| General analysis fine composition Analysis (per 100%) | |
|---|---|
| Protein | 36.8 |
| Fat (g) | 5.8 |
| Total carbohydrates (US) (g), of which: | 53.8 |
| Sugars (g) | 0.9 |
| Total dietary fibre (g) | 46.8 |

TABLE 3a-continued

General analysis fine composition
Analysis (per 100%)

| | |
|---|---|
| Insoluble fibre | 43.5 |
| Soluble fibre | 3.0 |
| Starch | 7 |
| Ash (g) | 3.3 |
| Sodium (mg) | <0.01 |

TABLE 3b

General analysis coarse composition
Analysis (per 100%)

| | |
|---|---|
| Protein | 23.8 |
| Fat (g) | 4.8 |
| Total carbohydrates (US) (g), of which: | 66.4 |
| Sugars (g) | 1.1 |
| Total dietary fibre (g) | 66.4 |
| Insoluble fibre | 64.5 |
| Soluble fibre | 1.9 |
| Starch | 0 |
| Ash (g) | 4.4 |
| Sodium (mg) | <0.01 |

From the results it can be concluded that the fine composition comprises a high total amount of protein and fibre fraction and the coarse composition comprises a high total amount of protein and fibre fraction, while both compositions have a really low fat, sugar and starch content.

Example 6

A microbiology analysis was performed on the fine and coarse compositions. The obtained results are illustrated in Tables 4a and 4b.

TABLE 4a

Microbiology analysis fine composition
Microbiology

| | |
|---|---|
| Standard plate count SPC | <10 000 cfu/g |
| Coliforms | <10 cfu/g |
| Yeast & Mold | <100 cfu/g |
| Listeria monocytogenes | Absent in 25 g |
| Salmonella | Absent in 25 g |

TABLE 4b

Microbiology analysis coarse composition
Microbiology

| | |
|---|---|
| Standard plate count SPC | <10 000 cfu/g |
| Coliforms | <10 cfu/g |
| Yeast & Mold | <100 cfu/g |
| Listeria monocytogenes | Absent in 25 g |
| Salmonella | Absent in 25 g |

The results show that neither composition comprises a harmful bacteria culture, and both are suitable to be used in a human diet.

Example 7

A specification analysis was performed on the fine and coarse compositions. The obtained results are illustrated in Tables 5a and 5b.

TABLE 5a

Specification analysis fine composition
Product specifications

| | |
|---|---|
| Particle size (d90) | 100 µm |
| Water absorption | 3.3 g water/g product |
| Moisture content | <10% |
| Dietary fibre composition | 100% |
| Arabinoxylan | 56.5% |
| Cellulose | 28.1% |
| Lignin | 15.4% |

TABLE 5b

Specification analysis coarse composition
Product specifications

| | |
|---|---|
| Particle size (d90) | 300 µm |
| Water absorption | 3.5 g water/g product |
| Moisture content | <10% |
| Dietary fibre composition | 100% |
| Arabinoxylan | 46.1% |
| Cellulose | 35.3% |
| Lignin | 18.6% |

Example 8

An amino acid analysis was performed on the fine and coarse compositions. The obtained results are illustrated in Tables 6a and 6b.

TABLE 6a

Amino acid analysis fine composition
Amino acid composition (per 100 g)

| | |
|---|---|
| Alanine | 2.28 g |
| Arginine | 1.84 g |
| Aspartic Acid | 2.78 g |
| Cysteine | 0.71 g |
| Glutamic acid | 8.50 g |
| Glycine | 1.51 g |
| Histidine | 0.91 g |
| Isoleucine | 1.65 g |
| Leucine | 3.96 g |
| Lysine | 1.41 g |
| Methionine | 0.77 g |
| Phenylalanine | 2.35 g |
| Proline | 3.90 g |
| Serine | 1.92 g |
| Threonine | 1.51 g |
| Tryptophan | 0.49 g |
| Tyrosine | 1.40 g |
| Valine | 2.17 g |

The results show that the tested fine composition comprises an essential amino acid content of 40.6% dry mass by weight, a conditionally essential amino acid content of 9.36% dry mass by weight and a non-essential amino acid content of 15.48% dry mass by weight.

TABLE 6b

Amino acid analysis fine composition
Amino acid composition (per 100 g)

| | |
|---|---|
| Alanine | 1.24 g |
| Arginine | 0.95 g |
| Aspartic Acid | 1.45 g |
| Cysteine | 0.35 g |
| Glutamic acid | 4.00 g |

TABLE 6b-continued

Amino acid analysis fine composition
Amino acid composition (per 100 g)

| | |
|---|---|
| Glycine | 0.79 g |
| Histidine | 0.48 g |
| Isoleucine | 0.81 g |
| Leucine | 2.09 g |
| Lysine | 0.76 g |
| Methionine | 0.38 g |
| Phenylalanine | 1.14 g |
| Proline | 1.90 g |
| Serine | 0.98 g |
| Threonine | 0.78 g |
| Tryptophan | 0.22 g |
| Tyrosine | 0.63 g |
| Valine | 1.10 g |

The results show that the tested coarse composition comprises an essential amino acid content of 7.76% dry mass by weight, a conditionally essential amino acid content of 4.62% dry mass by weight and a non-essential amino acid content of 7.67% dry mass by weight.

Example 9

A mineral analysis was performed on the fine and coarse compositions. The obtained results are illustrated in Tables 7a and 7b.

TABLE 7a

Mineral analysis fine composition
Minerals

| | |
|---|---|
| Calcium | 0.37 g/100 g |
| Copper | 18.1 mg/kg |
| Iron | 256 mg/kg |
| Magnesium | 0.225 g/100 g |
| Manganese | 51.1 mg/kg |
| Phosphorous | 0.59 g/100 g |
| Selenium | 0.124 mg/kg |
| Zinc | 95.5 mg/kg |

TABLE 7b

Mineral analysis coarse composition
Minerals

| | |
|---|---|
| Calcium | 0.33 g/100 g |
| Copper | 9.48 mg/kg |
| Iron | 143 mg/kg |
| Magnesium | 0.2 g/100 g |
| Manganese | 44.7 mg/kg |
| Phosphorous | 0.51 g/100 g |
| Selenium | 0.068 mg/kg |
| Zinc | 81.6 mg/kg |

Example 10

A vitamin analysis was performed on the fine and coarse compositions. The obtained results are illustrated in Tables 8a and 8b.

TABLE 8a

Vitamin analysis fine composition
Vitamins

| | |
|---|---|
| Vitamin B1-Thiamine | <0.15 mg/kg |
| Vitamin B2-Rivoflavin | 0.626 mg/kg |
| Vitamin B3-Niacin | 0.566 mg/100 g |
| Vitamin B5-Panthotenic acid | 0.191 mg/kg |
| Vitamin B6-Pyridoxie Hydrochloride | 0.03 mg/100 g |
| Vitamin B8-Biotin | 32.4 µg/100 g |
| Vitamin B9-Folate | 0.219 mg/kg |
| Vitamin B12-Cyanobalamin | <0.25 µg/100 g |
| Vitamin E | 6.44 mg/kg |
| Vitamin K1 | 6.82 µg/100 g |

TABLE 8b

Vitamin analysis coarse composition
Vitamins

| | |
|---|---|
| Vitamin B1-Thiamine | 0.33 g/100 g |
| Vitamin B2-Rivoflavin | 9.48 mg/kg |
| Vitamin B3-Niacin | 143 mg/kg |
| Vitamin B5-Panthotenic acid | 0.2 g/100 g |
| Vitamin B6-Pyridoxie Hydrochloride | 44.7 mg/kg |
| Vitamin B8-Biotin | 0.51 g/100 g |
| Vitamin B9-Folate | 0.068 mg/kg |
| Vitamin B12-Cyanobalamin | 81.6 mg/kg |
| Vitamin E | 0.33 g/100 g |
| Vitamin K1 | 9.48 mg/kg |

Example 11 (Reference)

The husk of a barley plant and the dry mass of a Brewers' Spent Grain sourced from a brewery was analyzed for the total dietary fibre content, the protein content, the fat content and the ash content. Additionally, the total amount of the protein and the fibre fraction and the ratio of the protein and the fibre fraction was calculated. The total amount of the protein and the fibre fraction was calculated by the summation of the protein fraction and the fibre fraction. The ratio of the protein and the fibre fraction was calculated by dividing the protein fraction by the fibre fraction. Table 9 illustrates the obtained results.

TABLE 9

BSG and barley husk composition

| Sample identification | Barleyhusk (grams per 100 gram of product) | Brewer's spent grain (grams per 100 gram of product) |
|---|---|---|
| Total Dietary Fibre | 89.24 | 56.7 |
| Protein | 4.49 | 29.5 |
| Fat | <0.5 | 6.4 |
| Ash | 5.07 | 3.9 |
| SUM protein + fibre | 93.73 | 86.2 |
| Ratio protein/fibre | 0.05 | 0.52 |

The invention claimed is:

1. A process for producing a fibre composition and a protein composition, wherein the process comprises:
   a) providing dried brewer's spent grain having a moisture content of 10% by weight or less;
   b) micronising the dried brewer's spent grain using a pin mill to provide micronised brewer's spent grain having a particle size (d50) of from 30 to 130 µm and a particle size (d90) of from 150 to 350 µm, as determined by laser diffraction, wherein "d50" refers to the size at which 50% of a composition's volume comprises particles with a size less than the specified value and "d90" refers to the size at which 90% of a composition's volume comprises particles with a size less than the specified value;

c) fractionating the micronised brewer's spent grain using an air classifier to provide a coarse fraction and a fine fraction; and d) collecting the coarse fraction to provide the fibre composition and collecting the fine fraction to provide the protein composition, wherein the fibre composition has a total combined content of protein and dietary fibre (% dry matter by weight) of between 70 and 100% and a ratio of protein to dietary fibre (dry matter by weight) of between 0.30 and 0.55; and, wherein the protein composition has a total combined content of protein and dietary fibre (% dry matter by weight) of between 80 and 100% and a ratio of protein to dietary fibre (dry matter by weight) of between 0.75 and 1.5;

wherein the total dietary fibre content is determined by AOAC 991.43 and the total protein content is determined by the Kjeldahl method using a conversion factor of 6.25.

2. A process according to claim 1, wherein the brewer's spent grain comprises spent barley and, optionally, one or more other spent grains or other starchy material selected from the group consisting of rice, corn, sorghum and cassava.

3. A process according to claim 1, wherein the brewer's spent grain is the spent grain obtained from a brewing process in which the grains used for brewing comprise barley in an amount of at least 40% by weight, based on the total dry matter weight of the grains.

4. A process according to claim 1, wherein the brewer's spent grain has a total dietary fibre content (% dry matter by weight) of from 48% to less than 62%, as determined by AOAC 991.43, and a total protein content (% dry matter by weight) of greater than 20% to less than 35%, as determined by the Kjeldahl method using a conversion factor of 6.25.

5. A process according to claim 1, wherein the pin mill is a counter-rotating pin mill.

6. A process according to claim 1, wherein the micronised brewer's spent grain has a bimodal particle size distribution.

7. A process according to claim 1, wherein the fibre composition has a particle size (d90) of between 200 and 500 µm, as determined by laser diffraction.

8. A process according to claim 1, wherein the fibre composition has a total dietary fibre content (% dry matter by weight) of greater than 55%, as determined by AOAC 991.43.

9. A process according to claim 1, wherein the fibre composition has a total insoluble fibre content (% dry matter by weight) of between 55 and 75%, and a total soluble dietary fibre content (% dry matter by weight) of between 0 and 10%, as determined by AOAC 2011.25.

10. A process according to claim 1, wherein the total dietary fibre content (dry matter by weight) of the fibre composition is at least 10% higher than the total dietary fibre content (dry matter by weight) of the brewer's spent grain, as determined by AOAC 991.43.

11. A process according to claim 1, wherein the total protein content (dry matter by weight) of the fibre composition is at least 16% lower than the total protein content (dry matter by weight) of the brewer's spent grain, as determined by the Kjeldahl method using a conversion factor of 6.25.

12. A process according to claim 1, wherein the protein composition has a particle size (d90) of between 20 and 200 µm, as determined by laser diffraction.

13. A process according to claim 1, wherein the protein composition has a total protein content (% dry matter by weight) of at least 33%, as determined by the Kjeldahl method using a conversion factor of 6.25.

14. A process according to claim 1, wherein the total protein content (dry matter by weight) of the protein composition is at least 19% higher than the total protein content (dry matter by weight) of the brewer's spent grain, as determined by the Kjeldahl method using a conversion factor of 6.25.

15. A process according to claim 1, wherein the total dietary fibre content (dry matter by weight) of the protein composition is at least 13% lower than the total dietary fibre content (dry matter by weight) of the brewer's spent grain, as determined by AOAC 991.43.

16. A process for producing a fibre composition and a protein composition, wherein the process comprises:

a) providing dried brewer's spent grain having a moisture content of 10% by weight or less;

b) micronising the dried brewer's spent grain using a pin mill to provide micronized brewer's spent grain having a particle size (d50) of from 30 to 130 µm and a particle size (d90) of from 150 to 350 µm, as determined by laser diffraction, wherein "d50" refers to the size at which 50% of a composition's volume comprises particles with a size less than the specified value and "d90" refers to the size at which 90% of a composition's volume comprises particles with a size less than the specified value;

c) fractionating the micronised brewer's spent grain using an air classifier to provide a first coarse fraction and a first fine fraction;

d) micronising the first coarse fraction to provide a micronised first coarse fraction;

e) fractionating the micronised first coarse fraction to provide a second coarse fraction and a second fine fraction;

f) collecting the second coarse fraction to provide the fibre composition, wherein the fibre composition has a total combined content of protein and dietary fibre (% dry matter by weight) of between 70 and 100% and a ratio of protein to dietary fibre (dry matter by weight) of between 0.30 and 0.55; and g) combining the first and second fine fractions to provide the protein composition, wherein the protein composition has a total combined content of protein and dietary fibre (% dry matter by weight) of between 80 and 100% and a ratio of protein to dietary fibre (dry matter by weight) of between 0.75 and 1.5;

wherein the total dietary fibre content is determined by AOAC 991.43 and the total protein content is determined by the Kjeldahl method using a conversion factor of 6.25.

17. A process for producing a fibre composition and a protein composition, wherein the process comprises:

a) providing dried brewer's spent grain having a moisture content of 10% by weight or less;

b) micronising the dried brewer's spent grain using a pin mill to provide micronized brewer's spent grain having a particle size (d50) of from 30 to 130 µm and a particle size (d90) of from 150 to 350 µm, as determined by laser diffraction, wherein "d50" refers to the size at which 50% of a composition's volume comprises particles with a size less than the specified value and "d90" refers to the size at which 90% of a composition's volume comprises particles with a size less than the specified value;

c) fractionating the micronised brewer's spent grain using an air classifier to provide a first coarse fraction and a first fine fraction;
d) fractionating the first coarse fraction to provide a second coarse fraction and a second fine fraction;
e) collecting the second coarse fraction to provide the fibre composition, wherein the fibre composition has a total combined content of protein and dietary fibre (% dry matter by weight) of between 70 and 100% and a ratio of protein to dietary fibre (dry matter by weight) of between 0.30 and 0.55; and
f) combining the first and second fine fractions to provide the protein composition, wherein the protein composition has a total combined content of protein and dietary fibre (% dry matter by weight) of between 80 and 100% and a ratio of protein to dietary fibre (dry matter by weight) of between 0.75 and 1.5;
wherein the total dietary fibre content is determined by AOAC 991.43 and the total protein content is determined by the Kjeldahl method using a conversion factor of 6.25.

* * * * *